INVENTORS
Loren E. DeGroot
Joseph A. Parini
Arlan R. VanKoevering
Robert A. Racy
William F. Roth

BY

ATTORNEYS

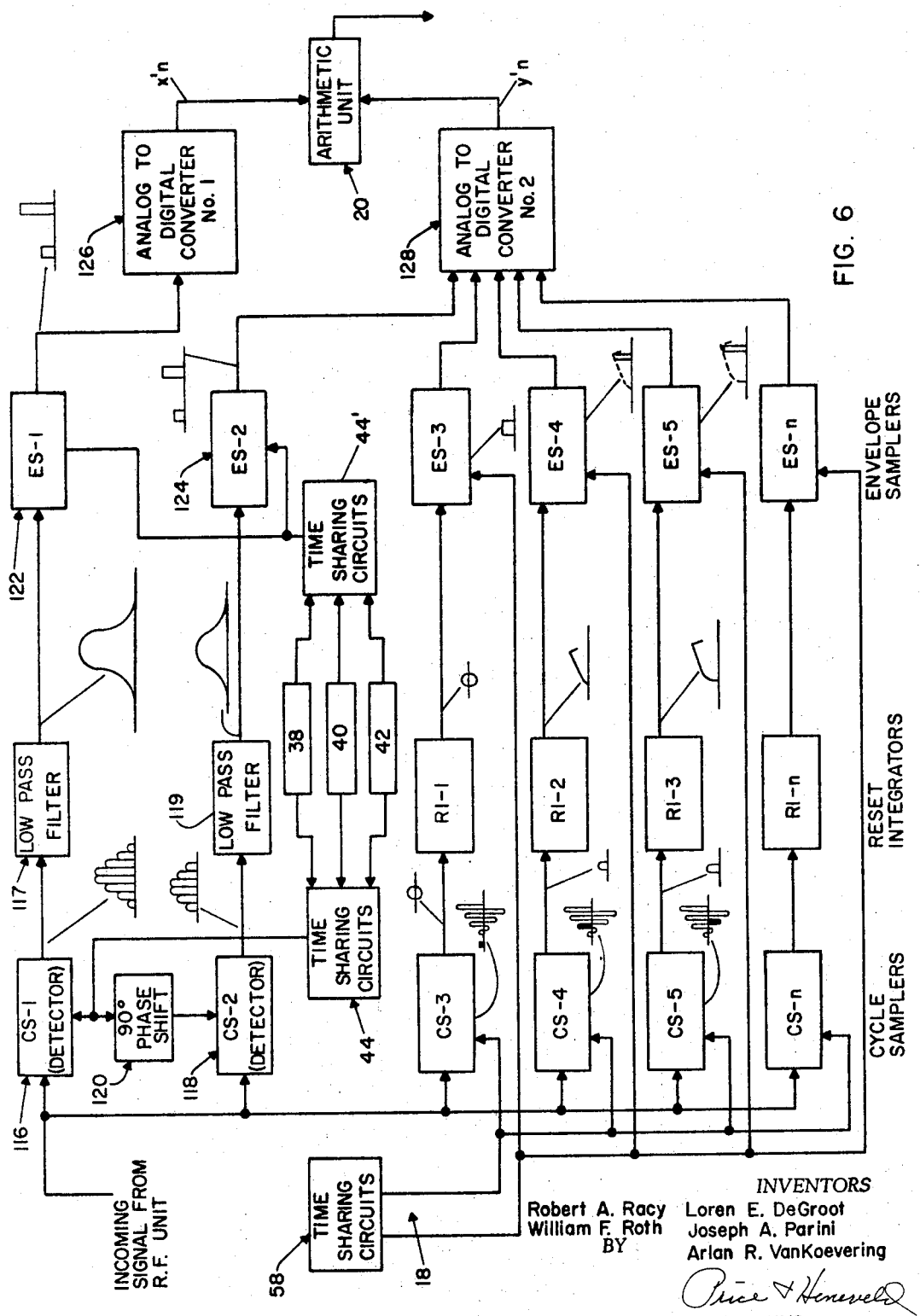

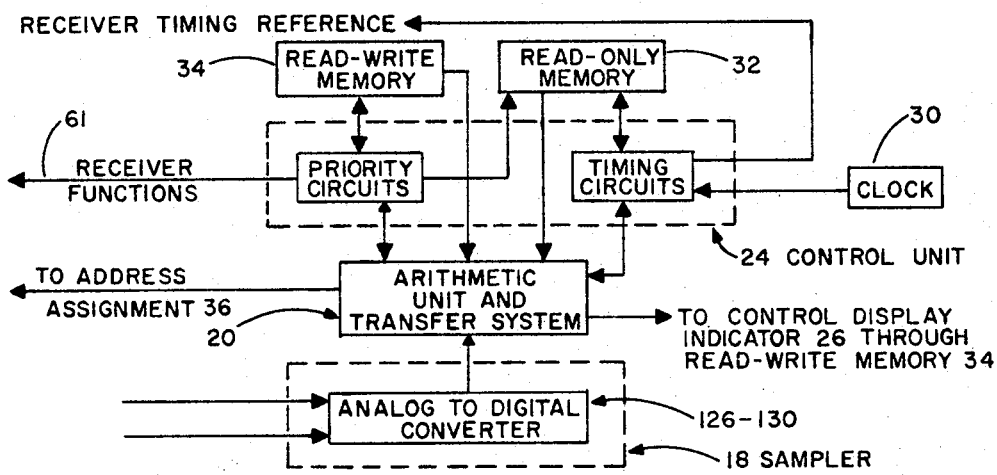

FIG. 9

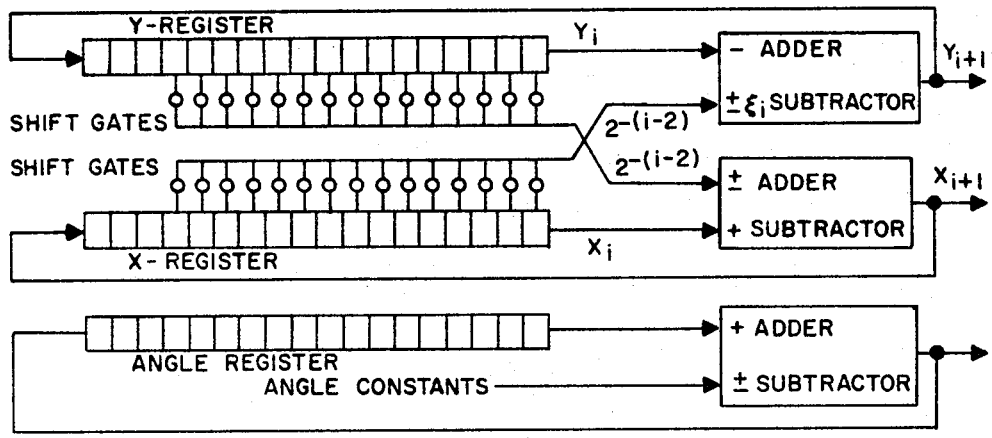

FIG. 10

ROTATION $x \rightarrow \boxed{X} \rightarrow K(x\cos\Psi - y\sin\Psi)$
$y \rightarrow \boxed{Y} \rightarrow K(x\sin\Psi + y\cos\Psi)$
$\Psi \rightarrow \boxed{A} \rightarrow 0$

RESOLUTION $x \rightarrow \boxed{X} \rightarrow K\sqrt{x^2+y^2}$
$y \rightarrow \boxed{Y} \rightarrow 0$
$\Psi \rightarrow \boxed{A} \rightarrow \arctan y/x$

FIG. 11

INVENTORS
Loren E. DeGroot
Joseph A. Parini
Arlan R. VanKoevering
Robert A. Racy
William F. Roth
BY

ATTORNEYS $a_i = \tan^{-1} 2^{-(i-2)}$

BY SIMILAR TRIANGLES $$\frac{\Delta x}{y_i} = \frac{2^{-(i-2)} R_i}{R_i}$$

$$\Delta x = 2^{-(i-2)} y_i$$

$$\boxed{x_{i+1} = x_i + 2^{-(i-2)} y_i} \text{ ALSO}$$

$$\boxed{y_{i+1} = y_i - 2^{-(i-2)} x_i}$$

$$R_{i+1} = \sqrt{R_i^2 + 2^{-(i-2)} R_i^2}$$

$$\boxed{R_{i+1} = R_i \sqrt{1 + 2^{-2(i-2)}}}$$

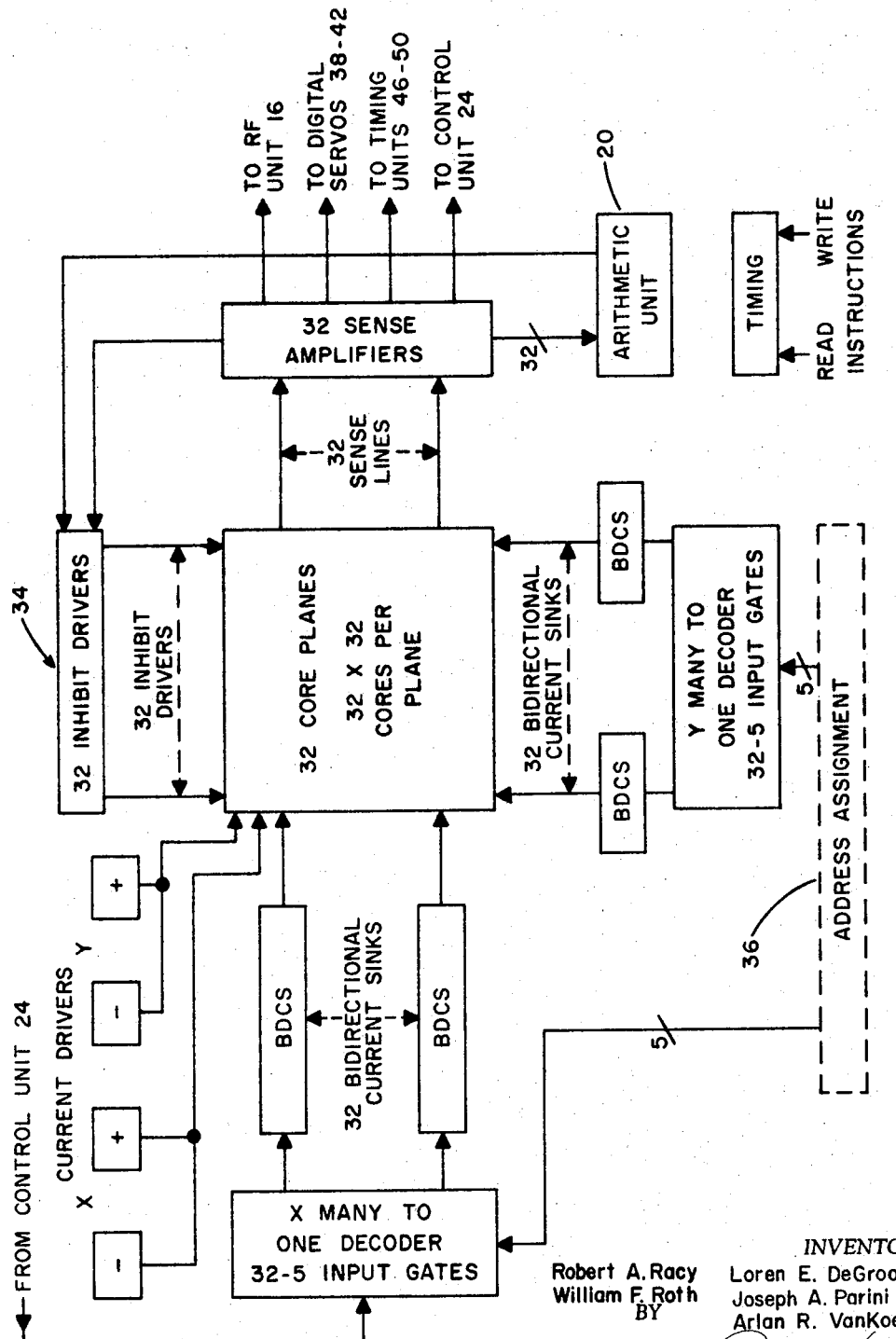

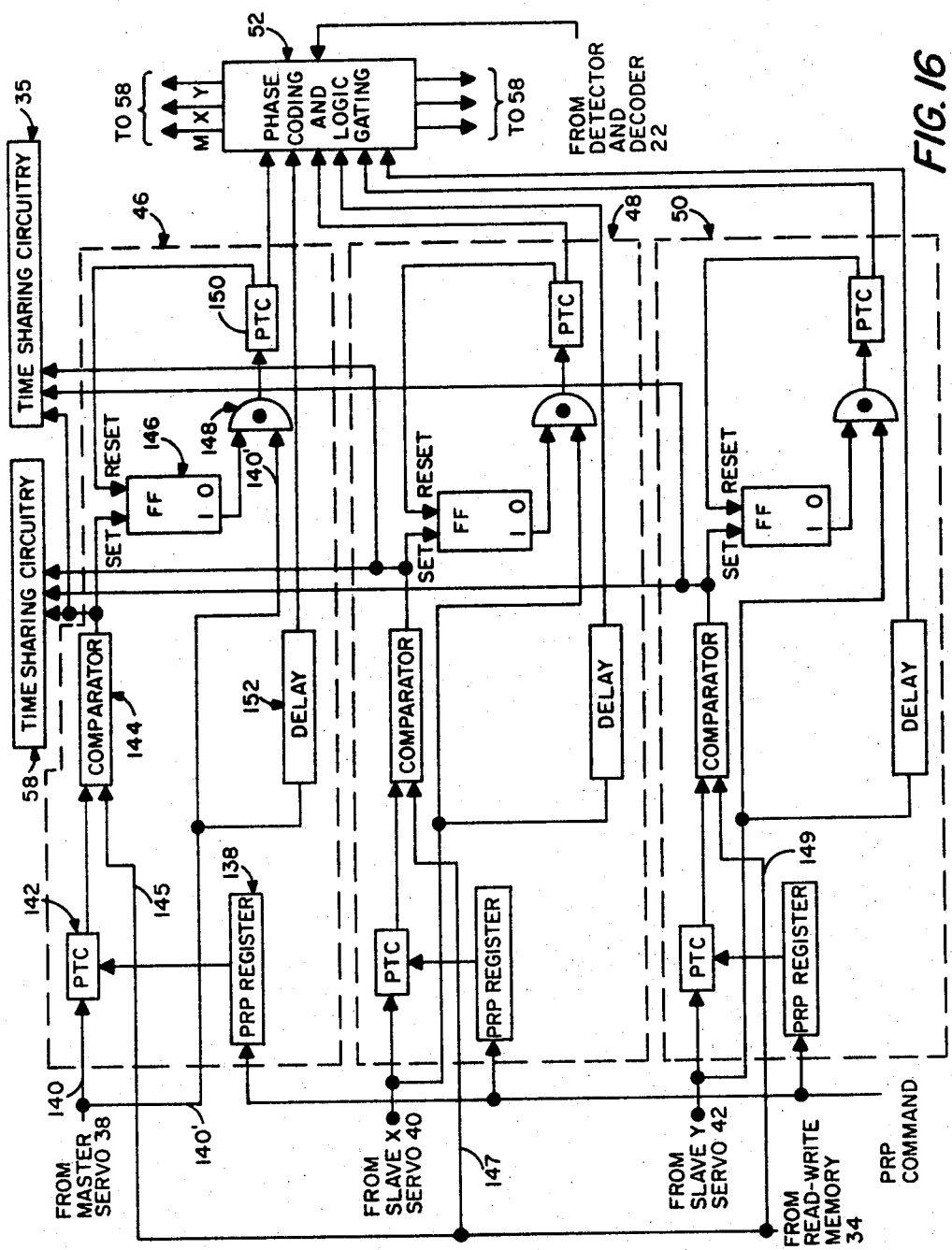

March 26, 1968  L. E. DE GROOT ET AL  3,375,520

INTEGRATED NAVIGATION RECEIVER-COMPUTER

Filed May 7, 1965  11 Sheets-Sheet 11

INVENTORS
Robert A. Racy   Loren E. DeGroot
William F. Roth  Joseph A. Parini
BY               Arlan R. VanKoevering Price & Henneveld
ATTORNEYS

United States Patent Office 3,375,520
Patented Mar. 26, 1968

3,375,520
INTEGRATED NAVIGATION
RECEIVER-COMPUTER
Loren E. De Groot, Ann Arbor, and Joseph A. Parini, Arlan R. Van Koevering, William F. Roth, and Robert A. Racy, Grand Rapids, Mich., assignors to Lear Siegler, Inc.
Filed May 7, 1965, Ser. No. 454,033
24 Claims. (Cl. 343—103)

ABSTRACT OF THE DISCLOSURE

A unitary, integrated navigation instrument in which RF receiving and sampling operations and hyperbolic coordinate conversion operations are provided by time-sharing functional component groupings forming a sampler stage or section, an arithmetic unit, a memory, and a detector and sequential decoder section with a basic RF tuning unit and with each other through the operation of a control unit including timing and priority circuits, to form an instrument which does not have a separate receiver and a computer-converter, but which nonetheless performs the functions of both. Also, the computer operation so provided will compute the approximate maximum strength of signals to be initially received from a transmitting station complex, based upon present position information which is known to the pilot and inserted by him into the computer, to provide computed control signals to the receiver operation which initialize or preset the latter to greatly facilitate signal search and acquisition. Such control signals are connected into attenuation and gain-controlling circuitry in the RF tuner to effect signal attenuation and gain control in accordance with the expected strength of the signals for that particular initial position before the signals have actually been acquired. Also, the computer operation computes the approximate hyperbolic time differences to be expected for that particular approximated initial position and these are coupled to the component groupings in the instrument forming the timing units which under actual tracking conditions will continuously measure the true time differences from the signals actually received, to preset the time-measuring circuitry for faster and more accurate initial acquisition of the signals to be received.

---

This invention relates to a navigation instrument for use in radio navigation systems of the type generally known as Loran-C, and more particularly to an integrated electronic instrument having receiving and computing means with interdependent operational elements, for use in such navigation systems.

Navigation systems of the kind typified by the present Loran-C system have been in use for some time. Basically, such systems include a complex of widely spaced radio transmitting stations which include a Master station, a Slave X station, a Slave Y station, and sometimes Z and W slaves as well. The systems operate by transmitting very accurately time-spaced pulse groupings from each of the transmitters, which occur in Master-Slave X-Slave Y sequence each pulse repetition period. Different transmitter complexes are identifiable from each other by the use of different pulse repetition periods, and also by different phase coding of the pulses in the pulse groups. These navigation systems are utilized by receiving the radio transmissions from a particular transmitting complex and measuring very accurately the time differences between receipt of the Master pulse group and the Slave X pulse group, and the Master pulse group and Slave Y pulse group.

The locus of points of constant time difference between the master and each slave station is a family of intersecting hyperbolic lines of position. Consequently, when a particular pair of time differences have been measured, the position of the receiver becomes known relative to a hyperbolic frame of reference. This is in itself somewhat meaningless, however, until the position which has been fixed has also been converted from the hyperbolic frame of reference to the conventional orthogonal latitude and longitude coordinates. In the past, this conversion was performed by an individual person, and this required a specially trained receiver operator. Further, the conversion involved very tedious calculations plus the use of special charts, some of which provided the hyperbolic lines of position superimposed over the orthogonal grid. This was obviously a very time consuming process, and it was also subject to error from many sources.

Since at best this method of navigation showed the position occupied when the signals were received and the calculation made, which was likely to be many minutes before, and did not show what the actual present position was, the very great inherent accuracy of this system was not fully utilized, and the system was practicable only for ships and for relatively slow-moving aircraft. Moreover, the radio receivers required to detect and track Loran-C signals have in the past been very large and complex, and commensurately very heavy, if they were of a quality which would preserve the inherent accuracy in the system, and this factor has discouraged and restricted use of the system in aircraft.

Relatively recently, miniaturized and micro-circuited digital auto-track receivers have been developed which are not only comparatively accurate, but which are small, compact, and light-weight as well, and so are useable in many types of aircraft. Further, even more recently, a miniaturized airborne navigation computer has been developed by the assignee of the present invention which will automatically perform the conversion of the hyperbolic frame of reference time signals produced by the receiver into orthogonal latitude and longitude coordinates. The solution times of this computing equipment are very fast, and consequently the resulting orthogonal navigation information is updated regularly and constantly to provide in effect constant position fixes for the aircraft carrying the equipment. Since these fixes are obtained very rapidly, they closely approximate present position.

Although very greatly improved, the foregoing modern equipment is not without its own limitations. For example, the weight and size penalty of a separate receiver and a separate computer is significant. Further, the search and acquisition times required by present receivers is typically rather long, sometimes as much as fifteen minutes or longer. Since the Loran signals are completely "buried" in noise and continuous wave interference (signal to noise ratios being as great as minus fifteen db), detecting the Loran signals becomes a difficult task requiring substantial integration times. Also, after being detected, the signals must be correlated in order to identify the different stations in a transmitting complex before time differences can be measured. All of this significantly hampers the search and acquisition of the signals. Also, differences in the signal strength between transmitting stations in a single Loran complex is likely to be significant, and may be as great as plus one-hundred db. This presents serious problems of saturation in the receiver amplifying section which further add to the difficulty of accurate and rapid signal search.

Accordingly, it is a major objective of the present invention to provide a completely integrated electronic navigation instrument having a combination receiving and computing means with interdependent and time-shared operational components and elements, thus greatly reducing the size and weight requirements of the system and effecting commensurately great savings in manufacturing costs due to the elimination of a great many component assemblies, while at the same time greatly improving the ultimate operation of the instrument by increasing its inherent accuracy.

Another important object of the present invention is to provide an electronic navigation instrument having receiving and computing means for the purposes noted, which provides means for inserting preliminary navigation information into the computing portion, where approximate or expected criteria for the search and reception of the Loran signals is computed and supplied to the receiving portion of the instrument to pre-set the same to facilitate and speed the search and the reception of the transmitted signals.

Still another object of the present invention is to provide a navigation instrument of the type noted in which said computing means includes a memory apparatus containing stored information relating to the position of different Loran transmitting complexes and information relating to the transmitted power from each such station, which computer means when supplied with present aircraft position information computes the maximum expected received signal strength and pre-sets the receiving means accordingly, so that signal search is initially performed for the strongest signal likely to be received, regardless of whether that signal may be from a master or a slave transmitting station.

Still another object of the present invention is to provide a navigating instrument of the character noted in which the said computing means pre-sets the receiving means by supplying a control signal to variable-attenuation circuitry at the receiver portion to automatically adjust the degree of attenuation required for the computed signal strength.

Another object of the present invention is to provide a navigation instrument of the general character noted, in which said computing means pre-sets the receiving means by supplying a control signal to variable-gain amplifying circuitry within the receiver, which adjusts the gain of the amplifier in accordance with the strength of the signals computed.

A still further object of the present invention is to provide a navigation instrument having the properties described, in which the said computing means pre-sets the receiving means by providing both an attenuation control signal and a gain control signal, so that the output from the receiving means will be at a substantially constant predetermined level regardless of the particular amplitude of the received signals.

A still further object of the present invention is to provide a navigation instrument in which the computing means computes from inserted present position information the predicted hyperbolic reference time-difference signals for that position, and provides corresponding signals to the receiving means such that the latter is pre-set to search for signal-pulse groupings within the computed time differences, thereby greatly speeding the search and acquisition of the transmitted signals.

A still further object of the present invention is to provide a navigation instrument of the character described, in which all of the foregoing pre-set operations are carried out substantially simultaneously.

The foregoing objects and advantages of this invention, together with many additional more specific attributes and features thereof, will become increasingly apparent to those skilled in the art to which the invention pertains following consideration of the ensuing specification and its appended claims, particularly when taken in conjunction with the accompanying drawings setting forth preferred embodiments of the invention.

In the drawings:

FIG. 6 is a schematic block diagram of the complete sampler unit shown in FIG. 1;

FIG. 9 is a block diagram illustrating the preferred computer organization for the navigating instrument;

FIG. 10 is a symbolic diagram showing arithmetic unit logic;

FIG. 11 is a symbolic representation of arithmetic unit operation;

FIG. 15 is a diagrammatic illustration of the preferred temporary or "read-write" memory for the present system;

FIG. 16 is a schematic block diagram of the timing units utilized in the system and shown in FIG. 1;

Figure 1:
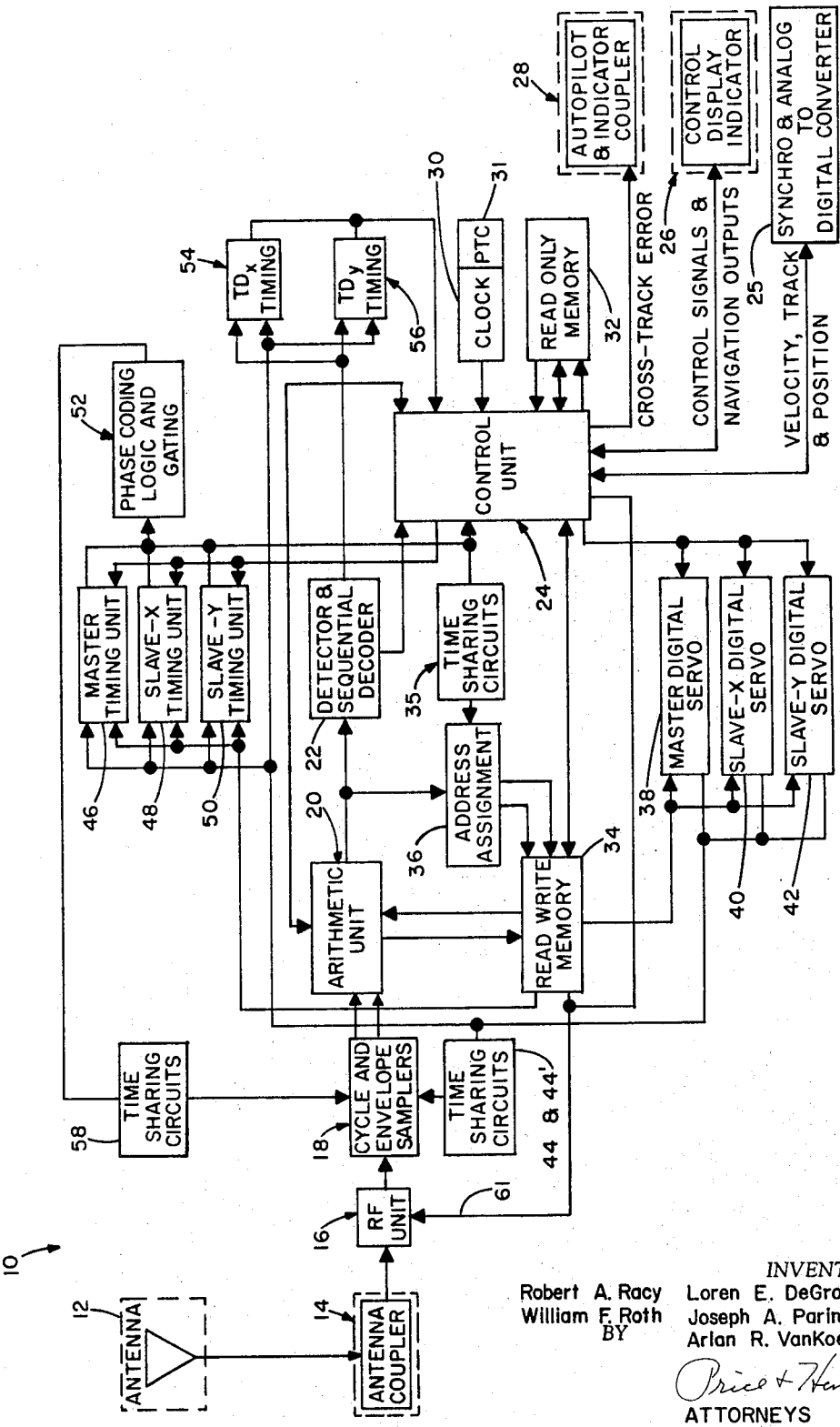
FIG. 1 is a schematic block diagram of the integrated navigation instrument, showing functionally distinguished component groupings.

Stated briefly, the present invention comprises a unitary, integrated electronic navigation instrument having combined receiving and computing means with interdependent operational components and elements. The navigation instrument receives radio signals from a predetermined complex of transmitting stations, samples selected portions of these signals, integrates the signal samplings to maximize received power, correlates the integrated signal samplings to determine the identity of the particular station sending particular signals, determines the hyperbolic reference time-difference coordinates by comparing the sampled signals relative to each other, and automatically makes the computational conversion of the hyperbolic coordinates into the more conventional orthogonal coordinates. This is accomplished by a minimum of functional circuit component groupings which are time-shared with each other by a central control unit which sequences and times the various programs. The navigation instrument further includes a control and display apparatus by which the orthogonal navigation information may be visibly displayed to the operator of the aircraft, and also by which known information such as present position in latitude and longitude coordinates may be inserted back into the computer portion of the instrument to facilitate the initial search and acquisition of the signals from the transmitter complex. The computing portion computes the probable or expected maximum strength of signals to be received at the inserted position, and supplies computed control signals to the other portions of the instrument which preset their operation. These signals include one for controlling the attenuation of incoming signals, another for controlling the gain of the amplifying portion of the receiver, and a third set of signals representative of the expected hyperbolic time differences for the inserted position. The approximate time differences are utilized to preset the time-difference measuring portion of the instrument, so that through the use of the appropriate gating techniques the search time may be greatly reduced.

Referring now in more detail to the inventive navigation apparatus, and to the most typical system in which to use the same, certain salient characteristics of Loran-C radio transmissions will first be set forth, since these in some measure indicate and define operational capabilities which particular component groupings of the instrument must possess.

Loran-C is a pulse-coded system which operates at a carrier frequency of one hundred kc. plus or minus ten kc., with a bandwidth at the three db point of seven to eight kc. The master and each of the slave stations transmit a coherent group of amplitude-modulated pulses having a pulse length of three hundred micro-seconds which are spaced one thousand micro-seconds apart. There are eight pulses in each slave pulse group and nine pulses in the master pulse group, the ninth such pulse being spaced approximately thirteen hundred micro-seconds from the eighth. The pulse repetition period (PRP) in which each of the stations sequentially transmits its pulse group varies between different Loran station complexes from one hundred thousand micro-seconds to twenty nine thousand micro-seconds. The radiated peak power is from two hundred and forty to five hundred kw., and the radiated power at the sample point (which is between twenty-five and thirty micro-seconds after the beginning of each pulse) is approximately sixty to seventy five kw. This gives the system a range on the order of two thousand nautical miles. The multiple pulses in each pulse group are intended to raise the average transmitted power, and the pulses in each group are phase-coded in two established code groupings which alternate between successive PRP's. This coding provides a way to discriminate between the master and the slave stations, and also a way to discriminate against ground-wave or sky-wave signals. The hyperbolic frame of reference time-differences which have been noted previously are a measure of the relative times of reception between the master pulse group and those of the different slave stations, and these are measured in micro-seconds. As has already been stated, the signal-to-noise ratio of the Loran transmission may be as great as minus fifteen db, and the received power level may vary by as much as one-hundred db.

In the schematic block diagram of FIG. 1, the navigation instrument 10 is illustrated as composed of functionally distinguishable component groupings, all of which are appropriately labeled for clarity. It will be seen that the preferred integrated instrument 10 makes use of an antenna 12 for receiving the Loran carrier signal, and an antenna coupler 14 for matching the impedance of the antenna to that of an RF tuning unit 16 within the instrument 10, in accordance with familiar design techniques.

The RF unit is coupled to a cycle and envelope sampler section 18, which in turn is coupled to an arithmetic computing unit 20. The arithmetic unit is coupled to a detector and sequential decoder 22, which in turn connects to a control unit 24, which acts to sequence and time the various receiver functions and computer programs, as will subsequently be explained further. The control unit 24 is coupled to an externally located control-display indicator 26, by which the outputs from the integrated instrument 10 may be visibly displayed to the operator of the aircraft, and also by which the operator may insert information into the instrument, as will be explained. Further, it will be noted that the control unit 24 may be coupled to an auto-pilot and indicator coupler 28, by which outputs from the navigation instrument 10 may be used in conjunction with various external aircraft control systems. Also, a synchro and analog-to-digital converter 25 of a known type is preferably utilized to insert externally-generated aircraft system outputs into the control unit 24, including aircraft velocity information for example.

It is to be noted that the integrated instrument 10 includes a digital clock apparatus 30 (preferably a crystal clock) which is connected to operate into the control unit 24, and further includes both a permanent or "read only" memory unit 32 and a temporary or "read-write" memory unit 34, which are connected to operate both into and out of the control unit 24. It will be observed that an address-assignment unit 36 couples the arithmetic unit 20 and the detector and sequential decoder 22 to the read-write memory 34, and is itself coupled to the control unit 24 through time-sharing circuitry 35. It will be appreciated that actual embodiments of the memory units 32 and 34, as well as the address-assignment unit 36 and the arithmetic unit 20 may provide these units in combinations and groupings that are specifically different than those shown here but which operate identically.

The instrument 10 further includes digital servo means 38, 40, and 42 for respective operation in conjunction with the Master, Slave X, and Slave Y pulse groupings. These servo means interconnect the control unit 24 and the read-write memory 34 and provide an output that is coupled to the sampler means 18 through time-sharing circuitry 44 and 44', and also coupled to Master, Slave X, and Slave Y timing units 46, 48, and 50, respectively.

The timing units 46, 48, and 50 are each coupled to receive signals from the control unit 24, and each of the timing units is connected to supply an output to a phase-coding logic and gating network 52. This output is also connected to the control unit 24. Further, all of the timing units are coupled to the read-write memory 34 to receive signals from it. A first time-difference measuring unit 54 receives the servo means output and measures the time difference between the Master and the Slave X pulse groupings (TDx), and a second time-difference measuring unit 56 receives a similar output and measures the time difference between the Master and the Slave Y pulse groupings (TDy). Each of the time-difference measuring units 54 and 56 are interconnected, and also are coupled to the control unit 24. Further, the phase-coding logic and gating network 52 is coupled back to the cycle and envelope samples 18, through time-sharing circuitry 58, as will be explained.

Finally, the control unit 24 is coupled directly to the RF tuning unit 16, as is the read-write memory 34.

As has already been stated, the integrated navigation instrument 10 is concerned primarily with: the detection and identification of Loran-C navigation signals in the presence of noise; the measurement of the difference in the times of reception of signals from the master and slave transmitters; the conversion of these time-difference signals into orthogonal (geodetic) latitude and longitude coordinates; and, if so desired, the computation of a variety of steering and other navigating information with respect to some preselected destination. The latter may include such as range and bearing angle to the destination, ground speed, track angle, cross-track error, and the like, which all may be computed once the correct geodetic position coordinates are provided and a selected destination is inserted into the unit. While the nature of some of the functional component groupings noted in connection with FIG. 1 will be clearly apparent once the underlying operation of the instrument and the connections shown in FIG. 1 are considered, certain of the more important and unique functional groupings will next be described in more detail, and a detailed description of the operation will also be given, from which the implementation of the device will become altogether clear.

Figure 2:
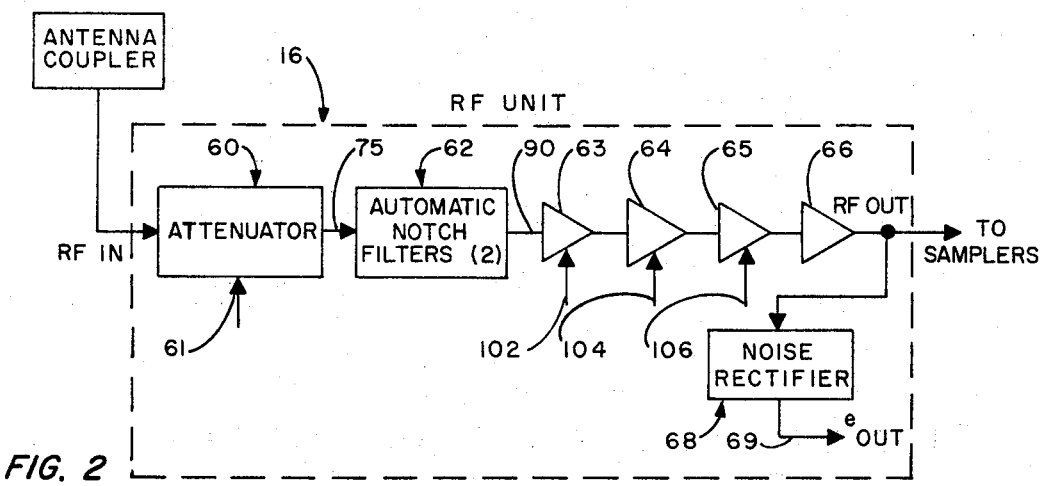
FIG. 2 is a schematic block diagram of the RF unit of the instrument.

The RF unit 16 is shown in more detail in the schematic block diagram of FIG. 2. It will here be seen that this unit is comprised of a number of sub-units, including a variable or switchable attenuator means 60 having an attenuating and a non-attenuating operating condition controlled by the presence or absence, respectively, of an input indicated at 61. The RF unit further includes automatic notch filters 62 by which continuous-wave interference closely surrounding the Loran carrier signal may be filtered out, four stages of RF amplification designated 63 through 66 inclusive, and a noise rectifier 68 having an output at conductor 69 that is proportionate to the level of the ambient noise being received with the Loran signals. As will be pointed out subsequently, the RF amplifying section incorporates bandwidth modulation and automatic gain control (AGC) features, amplifier bandwidth being determined by the mode of operation of the system and the ambient noise level of the operating service area.

Figure 3:
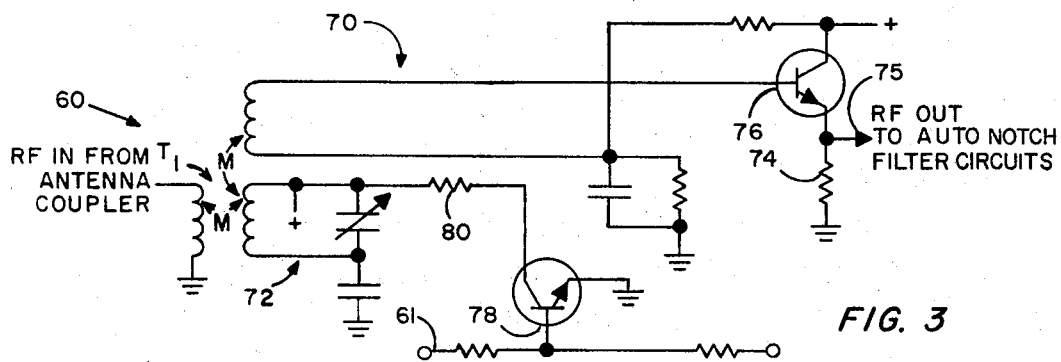
FIG. 3 is a schematic circuit diagram of preferred attenuator circuitry for the RF unit of FIG. 2.

A preferred implementation of the attenuator means 60 is illustrated in FIG. 3. Basically, this is a transformer-input coupling stage having a signal-coupling branch 70 and a loading network 72 which are mutually linked by the coupling transformer T1. Under normal operating conditions, the loading network 72 does not significantly affect signal transfer from the primary of transformer T1 through coupling network 70, where the signals are developed across the emitter resistor 74 of a transistor 76 and appear at output 75. However, during system operation in relatively close proximity to one or more of the transmitting stations, the received signal strength is so great that the RF amplifying portion would quickly be driven into saturation, consequently the received signals should be greatly attenuated. To accomplish this, an input is applied at terminal 61 of loading circuit 72 (see FIG. 2). This serves to bias transistor 78 thereof into a conductive state, which switches a loading resistor 80 into the circuit in parallel across the tuned transformer secondary winding. When the resistor 80 is placed in operation, the tuned circuit is loaded considerably and it begins to draw an appreciable current. This reduces the current flow through the coupling branch 70, and consequently the output across resistor 74 upon output conductor 75 is proportionally reduced, preferably by a factor on the order of fourteen db. Thus, saturation of the amplifying sections is prevented.

Figure 4:
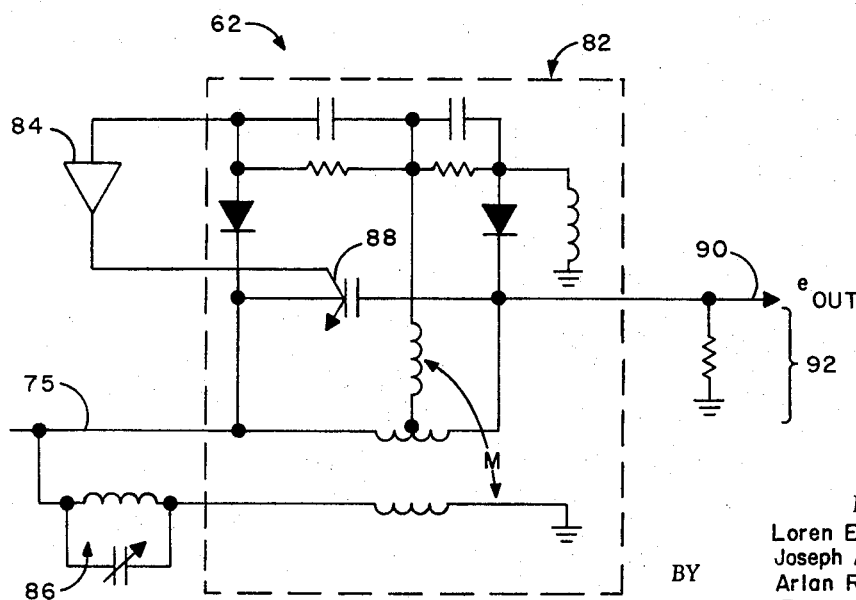
FIG. 4 is a schematic circuit diagram of preferred circuitry for the automatic notch filter of the RF unit of FIG. 2.

Although automatic notch filtering is known in the art, a preferred circuit for use in the present navigation instrument is illustrated in FIG. 4. A pair of such automatic notch, or band-stop filters, of this type are used in the instrument 10 to reject continuous-wave interference. Basically, the notch filter 62 consists of a ratio detector portion 82, an error amplifier 84, and a rejection tank circuit 86. The rejection tank 86 is tuned to the nominal Loran carrier frequency (i.e., one hundred kc.), and this circuit serves to prevent the ratio detector from rejecting the one hundred kc. Loran signal. The strongest continuous-wave interferring signal on either side of one hundred kc. will be detected by the ratio detector, however, and it will produce a corresponding output which drives the error amplifier 84. The output of the error amplifier is applied to a voltage-variable capacitor 88 within the ratio detector 82, and this component controls the rejection frequency of the notch filter circuit. Each of the two automatic notch filters preferably used in the navigation instrument operate in series, and should cover a bandwidth of approximately thirty kc. on either side of the one hundred kc. Loran signal. Consequently, as one of the circuits rejects one strong interferring signal, the other circuit will be unaffected by the rejected frequency and will be free to lock onto and reject another close interferring signal. As will be understood, the DC error voltage produced by the ratio detector serves to drive the resonant frequency of the ratio detector into alignment with the frequency of the interferring signal, making the filter circuit self-aligning with respect to the signal that is to be rejected. Thus, while the one hundred kc. Loran signal is unaffected by the filters, a "notch" of interferring frequencies on either side of the one hundred kc. Loran signal will be filtered out to significantly improve the signal-to-interference ratio of signals at output terminal 90 which are presented to the RF amplifying portion.

Figure 5:
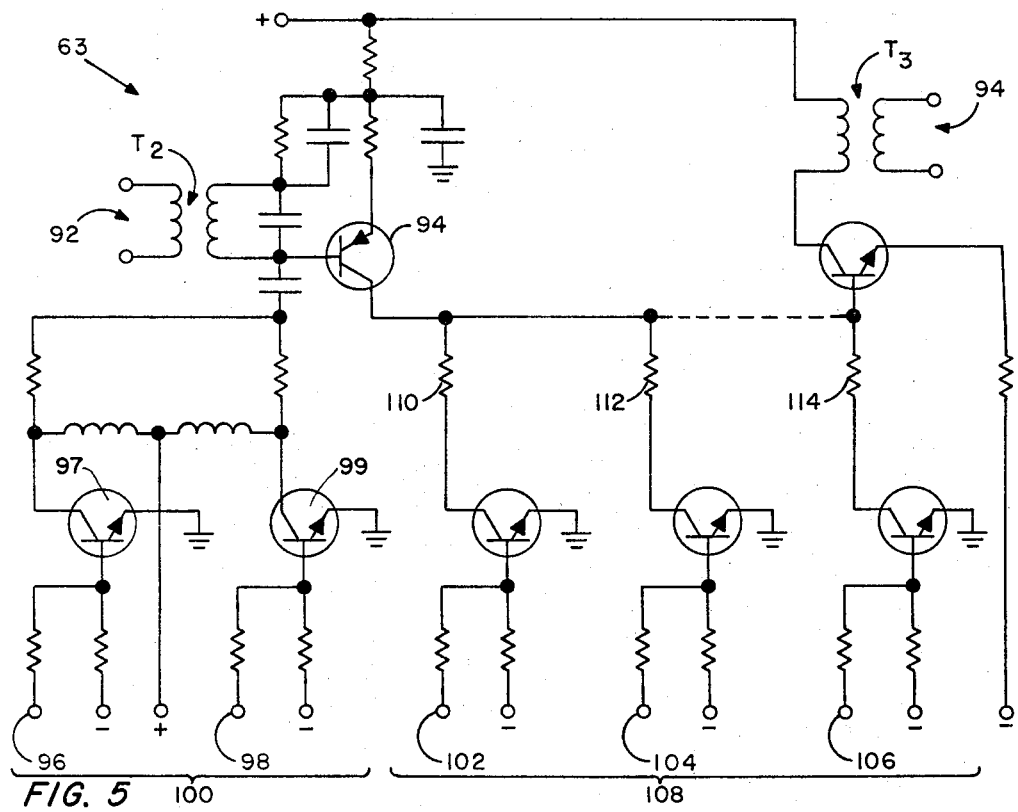
FIG. 5 is a schematic circuit diagram of a preferred RF amplifying stage, including binary-controlled bandwith and AGC networks.

An exemplary stage such as 63 of the RF amplifying section is illustrated in detail in FIG. 5. RF signals from the output 90 of the auto-notch filters 62 are presented to the input 92 of the amplifying stage, coupled across input transformer T2, amplified by a transistor 94, and coupled across an output transformer T3 to output 94. It should be borne in mind that the amplification of RF signals which have the wide dynamic range previously described must be accomplished with a phase shift error of less than one degree, in order to preserve and assure system accuracy. Moreover, both the bandwidth and the gain of the amplifying stages must be made variable. Bandwidth is controlled by the application of control signals to terminals 96 and 98 of a bandwidth control circuit branch 100. Such signals serve to drive transistors 97 and 99, respectively, into conduction, and when this occurs the resonant frequency of the tuned secondary of input transformer T2 is varied to change the bandwidth of the circuit. As will be seen subsequently, the bandwidth control signals are produced as a function of the mode of operation of the navigating instrument, and also as a function of the ambient noise level, which is continuously detected by the noise rectifier 68 of the RF unit.

Gain control of the RF amplifying stages is accomplished by providing control signals to terminals 102, 104, 106, etc. of the AGC circuits 108. Such signals serve to drive an associated transistor in each of the respective branches into conduction, thereby switching into the circuit a respectively associated resistor 110, 112, 114, etc. which adds to the total collector resistance of the RF amplifying transistor 94. In this manner, digital gain control is provided by employing a binary weighting system for the resistors 110, 112, 114, and the like. It will be apparent that such control is of great advantage in the present application, binary AGC control signals may be generated directly in the digital computing portion of the instrument. Furthermore, the level of signals received from each of the stations in a Loran-C or other complex is likely to be different from the level of the other signals from that complex, and consequently the gain of the amplifying circuitry must be sequentially changed perhaps as often as three times during each PRP.

Figure 7:
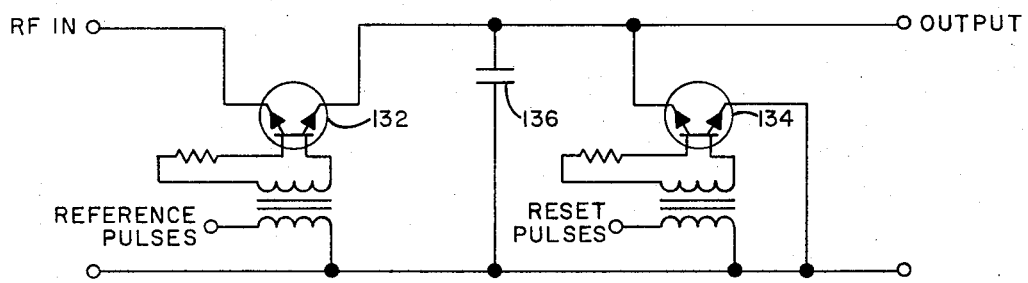
FIG. 7 is a schematic circuit diagram of a preferred sampler and reset integrator network.

As is shown in FIG. 1 and noted in connection with the discussion thereof, signals from the RF unit 16 pass into sampling circuitry 18. The nature of the sampling circuitry is illustrated in FIGS. 6 and 7. FIG. 6 shows the composite circuit in block form and includes wave diagrams to illustrate circuit performance, and FIG. 7 shows a preferred embodiment of the actual sampler circuitry. Referring first to FIG. 6, it will be seen that the sampler circuitry includes a battery of cycle samplers such as 116 and 118 (abbreviated CS for convenience) which feed into either low-pass filters such as 117 and 119 or reset integrators (RI No. 1, No. 2, etc.), and a like battery of envelope samplers such as 122 and 124 (abbreviated ES for convenience) which are connected to the output of the filters 117 and 119 and the reset integrators. The envelope samplers provide an output to analog-to-digital converting means such as 126 and 128, which in turn are coupled to the arithmetic unit 20 which has been noted previously.

More specifically, the sampler unit 18 includes a first pair of cycle samplers 116 and 118 which receive and sample the incoming signals from the RF unit 16 in accordance with an internally-generated reference signal which determines the sampling rate and time. An individual reference signal is provided for sampling each pulse grouping in the Loran PRP. The individual references are generated in the servo means 38, 40, and 42 noted in connection with FIG. 1 and supplied initially to the time-sharing matrices 44 and 44′, which gates the reference signals from each servo means in sequential order to the cycle samplers 116 and 118. It will be noted, however, that before the sequentially-gated references are supplied to sampler 118, they are shifted in phase by ninety degrees by passing through an appropriate phase-shift matrix 120.

As will be subsequently explained, the navigation instrument must initially search for and acquire the Loran signal by locating the pulse groupings from each transmitter precisely within each pulse repetition. Accordingly, the reference signals applied to the cycle samplers 116 and 118 are not initially expected to be in full synchronization with the Loran signal pulses. The samplers themselves are preferably synchronous detectors which, as is known, produce a maximum positive output when they are strobed directly in phase with the signal to be sampled, produce a maximum negative output when they are strobed one hundred and eighty degrees out of phase, and produce zero output when strobed either ninety degrees or two hundred and seventy degrees out of phase with the signals to be sampled. Consequently, the ninety degree phase shift introduced by matrix 120 insures that at least one of the samplers 116 or 118 will always produce at least some output. This aspect is illustrated by the waveforms shown in FIG. 6 at the output of samplers 116 and 118, which indicate that sampler 116 is only slightly out-of-phase with the Loran signals, while sampler 118 is nearly ninety degrees out-of-phase therewith.

The outputs of the samplers or detectors 116 and 118 are fed through low-pass filters 117 and 119, respectively, which generate the envelope of the sampled signal, as illustrated in FIG. 6. The filter output is passed into a pair of envelope samplers 122 and 124 which sample the same in a manner very similar to that of the cycle samplers 116 and 118, except the strobing reference signal controlling the envelope samplers is gated through time-sharing circuitry 44′ rather than the similar matrix 44. In effect, matrix 44′ serves to decrease the sampling rate by a factor of twenty. Basically, this approach utilizes preferred statistical techniques to reduce the great number of samples presented to the remainder of the instrument. That is, the rate of the references provided by the servo means 38, 40, and 42 and gated through time-sharing circuitry 44 is one hundred kc, the same as that of the Loran carrier signal. This produces one sample from the cycle samplers every five micro-seconds. This would require an enormous memory capacity in this system, and consequently this requirement is greatly reduced by the envelope samplers 122 and 124 in the manner noted to effect a reduction in the number of samples by a factor of twenty.

It is desired that the samples finally produced by the composite sampling apparatus be correlated with stored ideal references, and consequently the outputs from envelope samplers 122 and 124 are supplied to suitable analog-to-digital converting means, designated 126 and 128, where the pulses are given an appropriate digital number. Since the samples were taken ninety degrees apart, the digitized outputs from the converters 126 and 128 represent the X and Y component vectors of the signal (designated X′n and Y′n respectively). These component vectors are resolved or summed in order to determine the RMS vector length and angle. This takes place in the arithmetic unit 20.

The remaining portion of the sampler means 18 of FIG. 6 consists of a battery of similar cycle samplers which are designated CS(3), CS(4), CS(5), and, to illustrate that the exact number thereof is variable to suit particular circumstances, CS(n). These cycle samplers receive the incoming Loran signal in the same manner as cycle samplers 116 and 118, discussed previously, but their strobing reference signals are supplied from time-sharing circuitry matrix 58, and not from the time-sharing circuitry 44 or 44′. The reference signals to cycle samplers CS(3), CS(4), and the like are gated by the time-sharing matrix 58 to strobe these samplers in the manner indicated by the associated wave forms of FIG. 6, from which it will be seen that each of the samplers samples a different portion of the Loran signal pulse. The resulting samples are summed over a period of time by the reset integrators RI(1), RI(2), RI(3), and RI(n), respectively, to produce the waveform illustrated in connection with each.

The integrated signals are supplied next to the envelope samplers ES(3), ES(4), ES(5), and ES(n), respectively, where a sampling process generally equivalent to that described in connection with samplers 122 and 124. The reference pulses for ES(3), ES(4), etc. are also provided by the time-sharing circuit 58, however, and not by time-sharing circuitry 44′, as is true for envelope samplers 122 and 124. The reference signals for ES(3), etc. occur at a diminished rate, so that this group of samplers produces proportionately fewer samples than cycle samplers CS(1), etc., as discussed previously. The outputs from envelope samplers ES(3), etc., which represent the integral of the eight pulses in the pulse group, are supplied to analog-to-digital converting means 128, which assigns a digital value to the envelope samples. These are then coupled to the arithmetic unit 20 for computation purposes, as will subsequently be explained in greater detail.

Cycle samplers CS(3), CS(4), CS(5), etc. are used for different modes of operation than are the similar samplers 116 and 118; more specifically, the latter two samplers are used in the Rough Search operation, whereas the former battery of samplers are used in the Fine Search and Tracking modes, wherein hyperbolic time-difference coordinates are measured and converted into orthogonal reference coordinates.

The circuit shown in FIG. 7 illustrates a most preferred embodiment of the samplers, and also of the reset integrator portion shown in FIG. 6. The circuit of FIG. 7 incorporates a double-emitter semi-conductor integrated chopper 132 (and also 134) as the basic switching component, which has been selected because of its superior performance in having inherent stability, low transfer resistance, and very high-speed switching properties. The reference pulses are applied as indicated to switch the semi-conducter component sharply on and off to sample the RF input signals at the desired instant, and the resulting samplings are stored on an integrating capacitor 136 which sums them over a desired time interval. The integrator is reset by the application of reset pulses to semi-conductor device 134, which forms a second sampler connected in parallel with the integrating capacitor. When the sampler 134 is activated by a reset pulse, it conducts to short the integrating capacitor to ground, thereby discharging the integrated voltage accumulated thereon.

Figure 8:
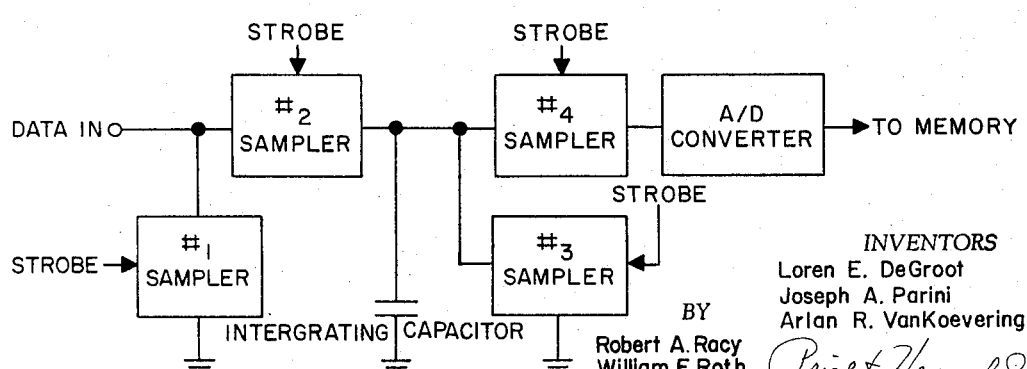
FIG. 8 is a diagrammatic presentation of a preferred arrangement for the sampler circuits constituting an error and drift compensation network.

A particular circuit configuration for the sampler and reset integrator is preferred in order to compensate for and minimize errors and drift introduced by the sampling circuits, the reset integrators, and the analog-to-digital converters. A block diagram of this configuration is shown in FIG. 8, and this circuitry is common for the cycle and envelope loops. As FIG. 1 has shown, the output from the sampling unit 18 is coupled through the arithmetic unit 20, the address-assignment unit 36, and into the read-write memory 34, which circuitry acts to integrate the output signals and store them in the memory unit. Thus, any offset errors or drift errors resulting from the sampling and integration process of unit 18 will be compounded and stored in the memory, along with the signals themselves. The circuit configuration of FIG. 8 compensates for this aspect in the following manner. During a time period in which no Loran signals are being processed, the sampler identified as No. 1 is strobed. This grounds the input of the circuit. At the same time, samplers designated No. 2 and No. 3 are strobed, and the resulting voltage is converted by the analog-to-digital converter and stored in the memory. This value represents the total error which has been introduced, and it is used as a correction signal to modify the processed and stored signal samplings during normal operating periods.

It will be recognized that many of the components utilized in the present inventive navigation instrument are entirely within the capabilities of one having ordinary skill in this art, and consequently no specific detailed discussion of such is deemed to be necessary here. For example, the analog-to-digital converters such as 126 and 128 of the sampling means 18 will be recognized as being implemented by such as an accurate clock signal gated into a pulse train counter under the control of a comparator circuit having the analog signals as an input. The analog low-pass filters 117 and 119 of the sampling means are each basically a first-order filtering device which requires only resistive and capacitive elements, in familiar configuration. However, it should be noted that digital filtering may be implemented by use of such components as an adder-subtractor, read-write memory, and a serial multiplier. All of these units are available within the arithmetic unit 20, and they can be time-shared as needed, thereby dispensing with the requirement of a separate individual filter network. Indeed, this practice is carried on throughout the integrated navigation instrument whenever possible, so that the instrument may accurately be described as having "central" major components which are time-shared in a variety of different ways. As for the servo means 38, 40, and 42 which are shown in FIG. 1, for the purposes of the present invention it may be assumed that these are merely pulse-generating circuits which provide the internal reference signals for strobing the sampling means 18 at a nominal frequency of one hundred kc. Actually, these servo loops are quite important to the total concept involved, but they form the subject matter of my copending application Ser. No. 454,073, filed May 7, 1965, to which reference is now made.

Figure 12:
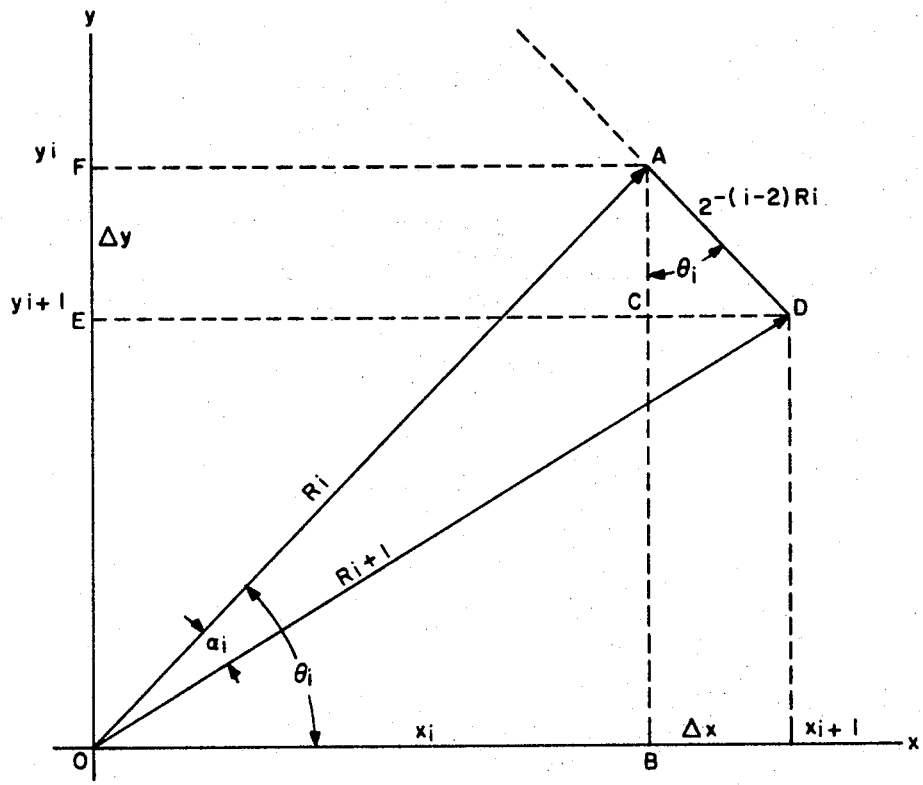
FIG. 12 is a vector diagram, including exemplary equations, of the principle operation of the arithmetic unit.

The preferred computer organization for utilization in the present navigation instrument is illustrated in the block diagram of FIG. 9. This organization defines a modified general purpose (GP) machine organization, which provides the necessary functions already related and to be subsequently described, while allowing a maximum time-sharing of digital hardware. It incorporates a stored program in addition to a typical computer bus word transfer system, but also includes a special arithmetic unit 20, core rope permanent ("read only") memory 32, and a multiple transfer bus system, which act with the GP machine structure to yield a faster and more reliable system. Although the nature of the units involved in the computer organization will be clear to those skilled in the art, certain of these are illustrated by specific figures in order to further clarify and fulfill the description thereof. Thus, the logic performed by the arithmetic unit 20 is illustrated symbolically in FIG. 10, and a symbolic representation of the operation of this unit is shown in FIG. 11. Further, exemplary equations and the vector diagrams thereof are fully illustrated in FIG. 12. An arithmetic unit developed along these principles will perform most trigonometric computations in no more time than is required for a simple multiplication. In addition to simple sines, co-sines, arc sines, arc co-sines, etc., the arithmetic unit is to be specifically capable of solving coordinate rotation and resolution equations, and also is to perform multiplication, division, square root, conversion from binary to binary coded decimal, and the converse.

Figure 13:
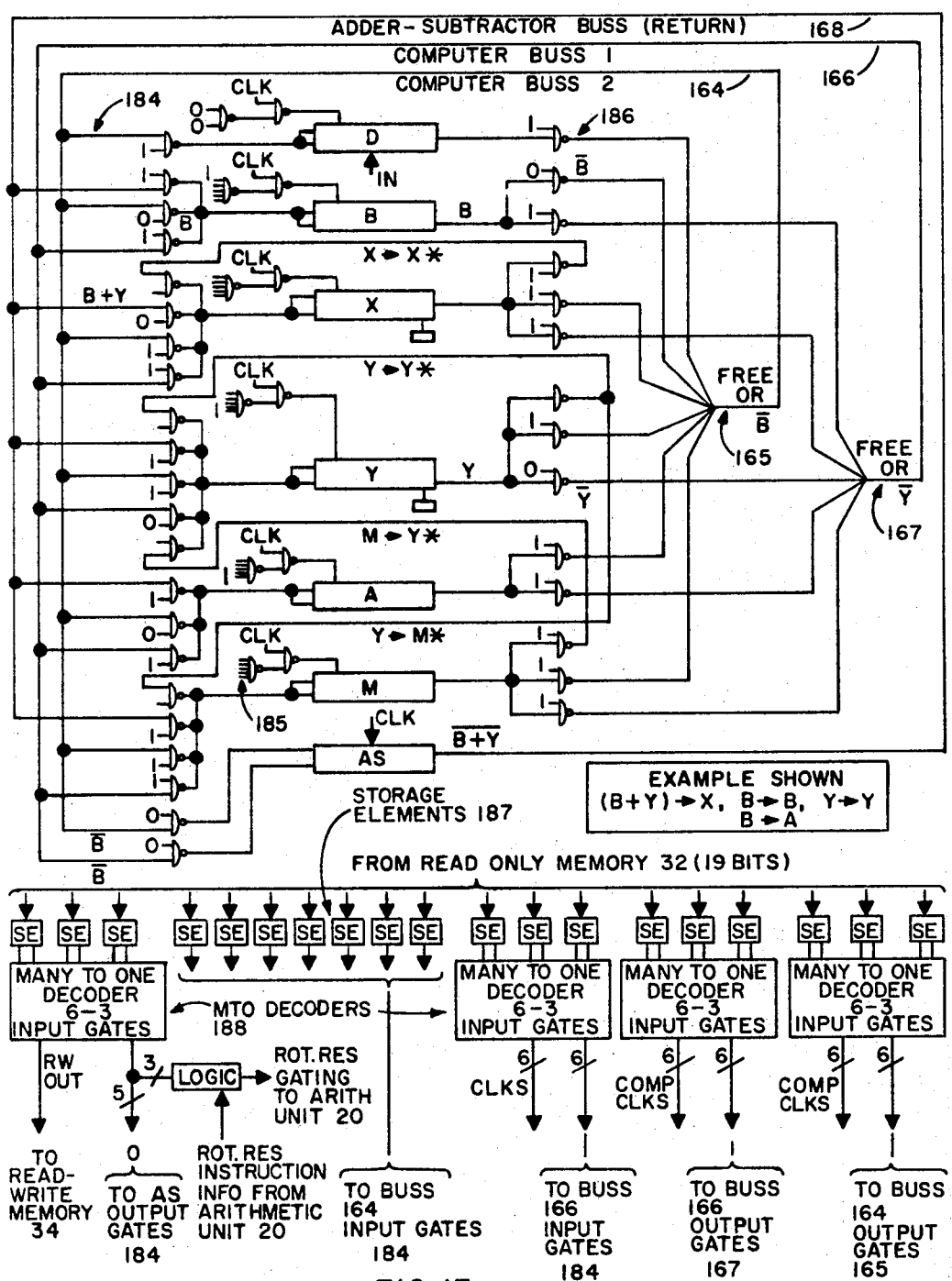
FIG. 13 is a schematic diagram showing the transfer system of the preferred computer organization.

In addition to the high speed arithmetic unit just noted, a multiple word transfer system is used. As opposed to typical GP machine structure that generally has single word transfer, the present computer organization is to include the feature of transferring many words simultaneously during a single program step. This naturally increases machine speed and reduces the number of program steps required. Such a transfer system is depicted diagrammatically in FIG. 13, which illustrates digital word transfer from one register to another by means of a multiple computer buss system. By having one complete buss 164 it is possible to transfer a word in any one register to any or all of the other registers, including the adder-subtractor unit (A.S.). In this connection, it will be noted from comparing FIGS. 8 and 11 that the adder-subtractor portion may actually be mechanized by utilizing from one to three individual registers, depending upon the solution times it is desired to obtain. At the same time, the transfer from a register can be either destructive (non-cyclic) or non-destructive (cyclic). Additionally, another buss system 166 having less flexibility in that only a capability of transferring (either destructively or non-destructively) from any one register to any one single register is also incorporated. Further, an adder-subtractor buss 168 is used to gate the output of the adder-subtractor (A.S.) to any of the computational registers, which are designated B, X, Y, A, and M. Finally, the various gating functions involved in the transfer operations herein described are provided by the batteries of "NOR" gates 184, 185 and 186, and the "FREE-OR" gates 165 and 167, whose multiple gating operations clearly appear from the figure and the example shown therein for the function $\overline{(B+Y)}$, and need not be unduly elaborated. As the figure shows, the inputs to these gates originate in the read only memory 32, and they are coupled to the gates through the battery of "storage elements" 187 (which may be flip-flops) and the battery of many-to-one decoders 188, which as indicated may include six three-input gates and consequently will each have six outputs, which are appropriately labeled. The gating of the central system clock 30 (abbreviated "CLK" in the figure) is determined by the gates 185, which determine the number of bits shifted in or out. The particular gates shown are of the "NOR" variety, although it will be understood that other conventional gating systems may be employed if desired.

The computer organization for the present navigational instrument has a requirement for both permanent (read only) and temporary (read-write) memories, as are depicted in FIGS. 1 and 9 by units 32 and 34, respectively. The permanent memory is required for system and computation constants, for the program to be followed, and for storing the gating required to control the various transfers just described. The temporary or read-write memory provides storage for intermediate results as the navigation computations progress through each cycle. Although it is possible to use the same physical device to satisfy both permanent and temporary requirements, there are advantages in having two memories, which each are suited to peculiar requirements. Such advantages include a reduction in electronics by eliminating "write" circuitry in the permanent memory, and a truly permanent memory in which the information content is unalterably fixed by construction. In the present system, both types of memory may have the same size, requiring a capacity of 1,024 words.

Figure 14:
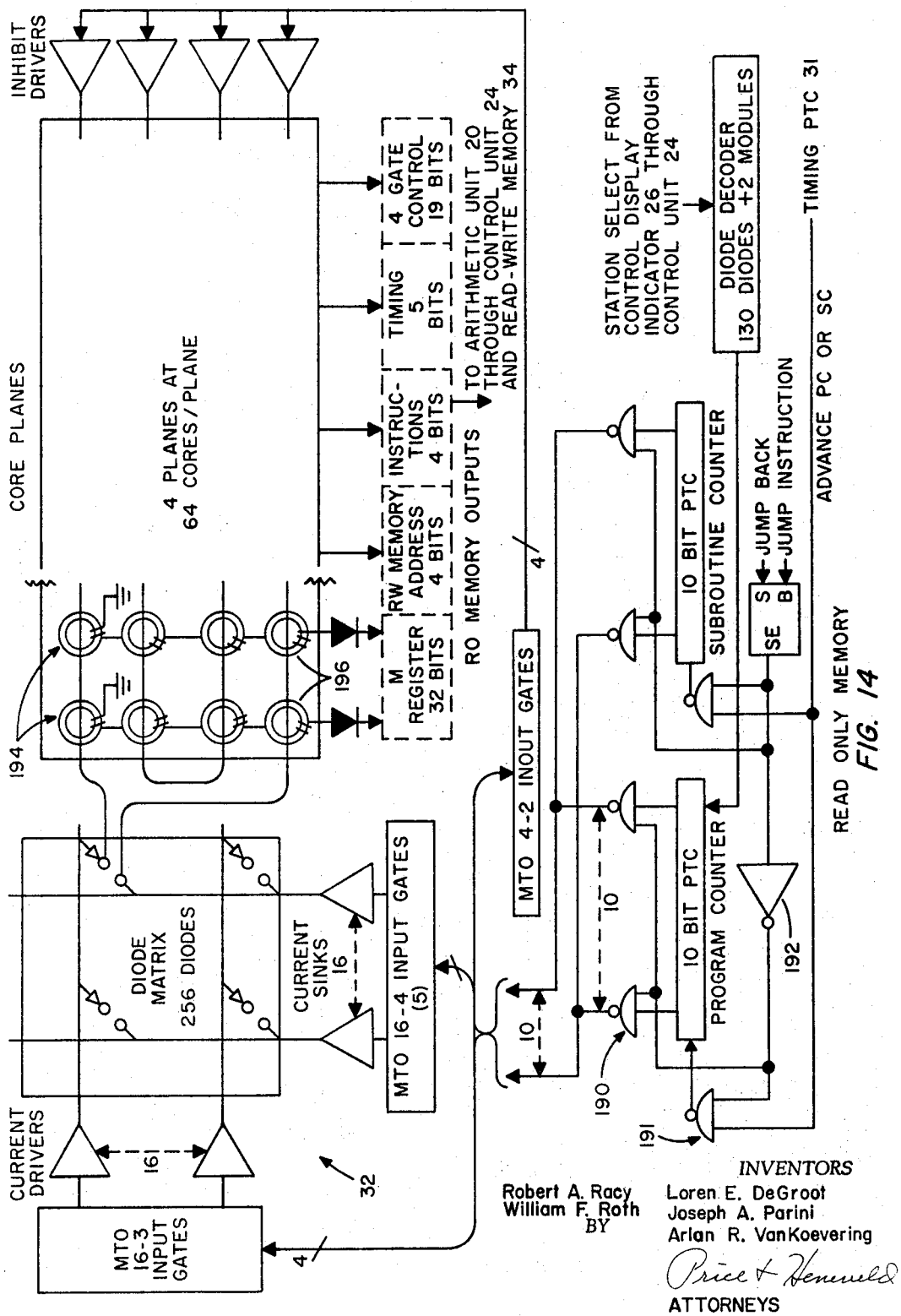
FIG. 14 is a diagramatic illustration of the preferred permanent or "read only" memory utilized in this system.

A preferred form of permanent memory is diagrammatically illustrated in FIG. 14. This is a core rope memory unit, which has the advantages of non-volatility and high reliability, and yet provides for relatively easy changing of its content by restringing wires in the core planes without modification to any electronic portion of the memory. It is contemplated that the labeling in this and other comparable figures will more than adequate identify the various components and component groupings contained therein. However, the NOR logic gates are designated 190 and 191, and the signal inversion means designated 192. Further, the donut-shaped memory cores are designated 194, and their sense windings designated 196. As for the temporary storage unit, this is diagrammatically illustrated in FIG. 15. This unit is of the conventional coincident current ferrite type, having a cycle time of ten micro-seconds. A storage of 1,024 words of thirty-two bits each is contained in thirty-two planes of 32 x 32 cores per plane. The core material is lithium ferrite, so that a wide temperature range of operation is possible. The electronics operating the temporary memory are mainly of the integrated semiconducter form, including all many-to-one (MTO) decoders, sense amplifiers, and timing units. Once again, it is expected that those skilled in the art will fully understand the nature of the various units upon examining FIG. 9 and upon becoming familiar with the nature of the operation of the navigational instrument, and consequently the matter illustrated in such FIGURES as 14 and 15 does not require further elaboration.

The previous remarks relating to the state of the art in connection with the analog-to-digital converters, digital filters, etc. are also true of the control unit 24, which has been noted in connection with FIG. 1 and which is illustrated in FIG. 9. In this figure it is seen that the control unit is comprised of the required priority circuits and timing circuits for properly performing the various programs. As will be understood, this unit provides the required timing and control signals for the navigation instrument, such that the various modes of operation are sequenced in a logical order with due regard to the real time signal-receiving functions. The control unit 24 embodies digital control techniques.

The timing units 46, 48 and 50 depicted in FIG. 1 and noted in connection therewith are illustrated in more detail in the schematic block diagram of FIG. 16. As is seen here, these units are basically identical to each other but operate substantially independently. The Master timing unit 46 receives signals from the Master servo means 38, while the Slave X timing unit 48 receives signals from the Slave X servo means 40, and the Slave Y timing unit 50 receives signals from the Y Servo means 42, as is borne out by the labeling in this figure.

Since each of the timing units is identical in configuration, only one need be given specific attention, such as for example the Master unit 46. This unit comprises a pulse repetition period register (PRP register) 138 which receives a given command signal from the control display indicator 26 (FIG. 1) and "holds" the PRP which is so selected for the purpose of applying a constant modulus feedback to a pulse train counter (PTC) 142. This acts to cause the PTC to divide the output pulse train supplied from Master servo 38 upon conductor 140 into the selected PRP by begin counting the pulses from a given point in its counting cycle that is different from its nominal reset point. The output count from PTC 142 is supplied to a comparator 144, whose other input is supplied directly from the read-write memory 34 upon conductor 145, as the figure illustrates. As will be understood, the comparator 144 is a gating device which compares two values and produces an output when a comparison is made, but which has no output when there is no comparison.

Upon making a comparison, the comparator 144 supplies an output which is coupled to the "set" terminal of a flip-flop 146 which enables one terminal of a two-terminal gate 148. The input to the other terminal of gate 148 is supplied upon conductor 140′ which, like conductor 140, carries the reference pulse train from Master servo 38. Thus, it will be apparent that so long as both inputs to gate 148 are enabled, this gate will pass the reference pulse train through to a second pulse train counter (PTC) designated 150. Pulse train counter 150 supplies its output to the phase coding and logic gating network 52, and at the same time provides a reset feedback pulse to the "reset" terminal of flip-flop 146 to end that particular counting cycle. The next succeeding cycle will be initiated by another comparison pulse from comparator 144. It is to be noted that the "set" pulses produced by the comparator are also supplied to the time sharing circuitry 58 and to the time-sharing circuitry 35, as the figure illustrates. The phase coding and logic gating network 52 applies the correct phase coding to the reference signals supplied to it from PTC 150, so that all of the pulses detected by the sampling unit 18 will be positive at the sampler output. It is to be noted that the gates produced by phase coding and logic network 52 are coupled to the time sharing circuit matrix 58, which as has been previously stated, supplies them to the sampler unit in proper time sequence.

Each of the structurally identical timing units 46, 48 and 50 operate in the same manner. Specifically, the PRP register (such as 138) acts upon a command from the control display indicator 26 to vary the counting modulus of the first PTC (such as 142), so that it counts in accordance with the pulse train from the servo unit (such as 38) over a predetermined repetition period. Upon receiving a computed signal from the read-write memory 34 (discussed in more detail subsequently), the comparator (such as 144) gates a reference pulse at a desired instant in the PRP from PTC 142. This reference pulse is applied to the time-sharing circuitry 58 and also to the flip-flop (such as 146) to set the same and cause the gate (such as 148) to pass the pulse train from the servo units to the second PTC (such as 150) which then counts over its established modulus to produce a desired repetition period of pulses that is applied to the phase coding and logic gating 52, PTC 150 shutting itself off by the feedback path to the reset terminal of the flip-flop. Finally, it is to be noted that each of the timing units includes a delay path 152 that couples the pulse trains from the servo units from conductor 140′ directly to the phase coding and logic gating network 52. This path introduces a delay into the reference pulse train that is preferably on the order of 2.5 micro-seconds, which compares analogically to the ninety degree phase shift for sampling purposes utilized in Rough Search Mode and described in connection with FIG. 6. Consequently, it will be appreciated that each of the timing units 46, 48 and 50 produces a first reference pulse train having a preselected PRP, a similar but delayed pulse train, and a reference pulse that is synchronized in a particular manner to the pulse trains.

Figure 17:
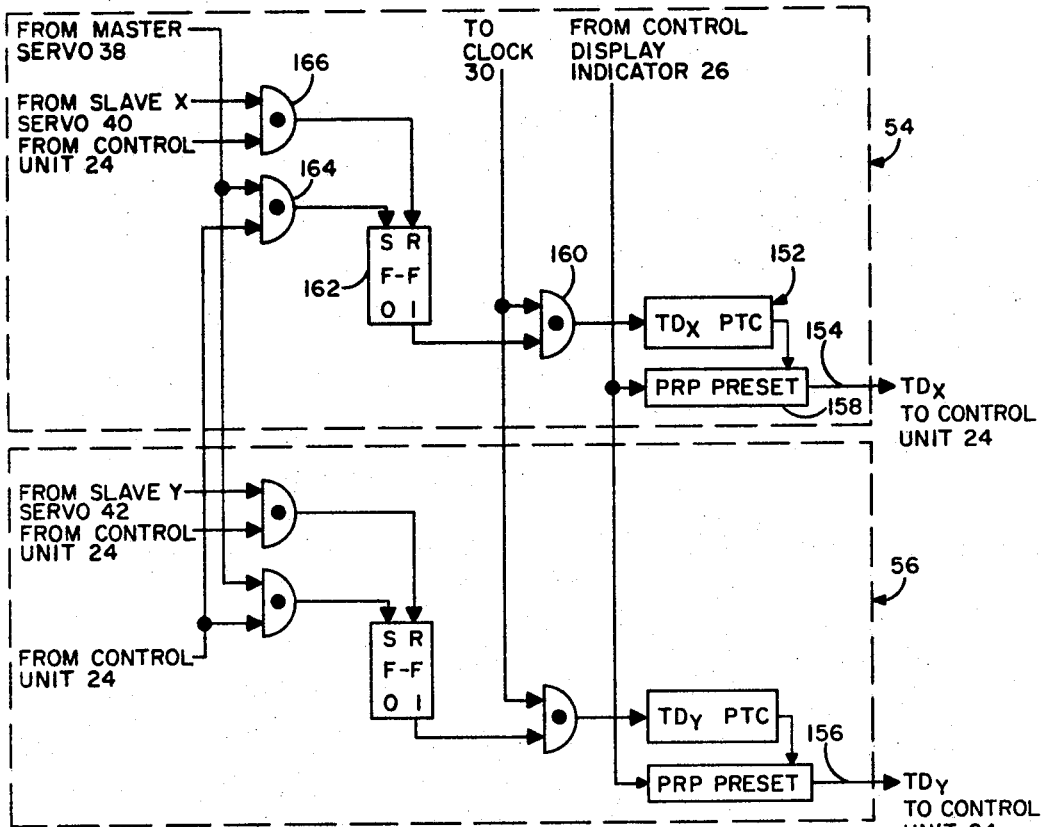
FIG. 17 is a schematic block diagram of a preferred time-difference measuring unit implementation for use in the present system.

The time-difference measuring units 54 and 56 seen in and described in connection with FIG. 1 are shown schematically in FIG. 17. It will be noted that each of these is a substantially identical unit composed of gating, a flip-flop, and a pulse train counter with a pulse repetition period reset register. The purpose of each of the time-difference units 54 and 56 is to measure with extreme accuracy the time difference between reception of the pulse groups from the Master and Slave X Loran stations (TDx), and the time difference between the Master and the Slave Y pulse groups (TDy). These time-difference measurements are presented as the output of each of the units at the terminals designated 154 and 156, respectively. As the legends indicate, these time-difference signals are coupled to the control unit 24 which, it will be recalled (see FIG. 9), actually forms part of the computer organization by which conversion of the time-difference measurements into orthogonal navigation coordinates will be accomplished.

Referring now specifically to unit 54 as exemplary of either time-difference unit, it will be observed that the time-difference measurements are derived by stopping and starting a pulse train counter 152, whose counting modulus is a function of the PRP selected by the control display indicator 26. The counting modulus of PTC 152 is established through a preset register 158. PTC 152 counts a pulse train generated by the central clock 30, which is gated into the counter by a control gate 160. This gate in turn is controlled by the logical "one" output of a flip-flop 162, which enables the second terminal of the gate. Flip-flop 162 is set when a gate 164 is enabled at both terminals. This requires coincidence of pulses from the Master servo means 38 and from the control unit 24. The flip-flop is reset to stop the count by another gate 166, which is enabled by the coincidence of pulses from the Slave X servo means 40 and the control unit 24. Consequently, it will be seen that at a given point in the Master servo pulse train, a command from the control unit will set the flip-flop and begin the count, whereas at a given point in the Slave X servo pulse train a command from the control unit will reset the flip-flop to end the count. This same system is used in unit 56, except that the Slave Y servo means 42 is involved instead of the Slave X servo 40.

Basically, the foregoing is believed to set forth to persons skilled in this art a full and complete description of the present invention. It will be understood that the control display indicator 26 provides required functions such as power on and off, a select means for different Loran transmitting complexes which generates an appropriate select or command signal representative of the particular PRP involved for each transmitting complex, selecting means for primary or secondary reception areas, a destination select, and further, a command input generating means for inserting present position coordinates into the computer organization; specifically, into the control unit 24. Additionally, as FIG. 1 illustrates and as has been mentioned previously, it is desirable to incorporate a synchro and analog-digital converter means 25 (see FIG. 1), by which inputs such as aircraft velocity, wind information, heading, etc. may be inserted into the navigating instrument from external sources available in the aircraft. Also, the control display indicator 26 should include means for visibly displaying the continuously-computed orthogonal navigation information, as for example a display of Nixie tubes, by which an alpha-numeric display may be obtained. As for the phase coding logic and gating network 52, it will be appreciated that this is a matrix which provides various gated outputs from the multiple inputs supplied to it, and which may be implemented by using phase coding, gating, and delay techniques similar to those used in the timing units 46, 48 and 50, illustrated in FIG. 16 and described in connection therewith.

*Operation*

Although various aspects of the operation of the present navigation instrument have been set forth previously in connection with the circuitry of the instrument, a somewhat more detailed and more comprehensive description of the operation and of the various operating modes of the system follows. From this, many aspects of the structure of the instrument, including its computer organization, will become even more apparent.

In its overall operation, the present navigation instrument has a variety of relatively distinct and different operating modes. When the aircraft utilizing the instrument is flown into a particular Loran-C tracking area, the instrument is activated by the pilot, who then operates the control-display indicator 26 to insert his approximate present position into the system. The navigating instrument then proceeds through a predetermined sequence of operation determined and controlled by the control unit 24. These include an Initialization Mode, a Rough Search Mode, a Fine Search Mode, a steady-state Tracking Mode, and a simultaneous Compute Mode, in which the conversion from hyperbolic time-difference coordinates to orthogonal latitude-longitude coordinates is performed, together with any of a variety of other computations which may be performed upon the orthogonal information. For example, the pilot may operate the control-display indicator to also insert a preselected destination, and the instrument will automatically compute certain steering information including distance to destination, ground speed, bearing, cross-track error, and the like.

In the Initialization Mode, the control-display indicator 26 (see FIG. 1) translates the present position information from the decimal form that the pilot actually selects into binary coded decimal bits and couples these to the control unit 24. The computing components (see FIG. 9) then cycle to perform a first computation, based upon the inserted position information and stored information relating to the particular Loran complex involved, to arrive at the maximum signal strength which the navigation instrument will receive from any of the stations in the Loran complex. Corresponding signals are then computed and coupled to the RF unit 16 to preset its signal-receiving parameters. Specifically, a binary attenuation signal is coupled to the attenuator 60 (see FIGS. 2 and 3) at its terminal 61 to automatically initiate desired signal attenuation, and a binary AGC signal is coupled to the RF amplifying portions 63, 64, and 65 (see FIGS. 2 and 5) at its input terminals 102, 104, and 106 and the like. Thus, the RF unit 16 is automatically preset in accordance with computed maximum signal strength to produce a uniform output signal which is coupled to the sampler means 18. It will be appreciated that by using the computer portion to preset the RF receiving portion, the search is initially conducted for the station having the strongest signal, and not for a particular station such as the master. This greatly increases the probability of detecting a known signal, and so reduces in the required search time. Further, in the Tracking Mode the attenuation and AGC are continually adjusted automatically as a function of the actual sampled and integrated signal plus noise.

Once the RF receiving portion 16 has been preset or initialized, Rough Search may be begun, under the command of the control unit 24. The purpose of the Rough Search Mode is to detect and identify the Loran signal envelope. Even though the instrument is searching for a definite or specific signal (i.e., the strongest one), the need for a Rough Search Mode will be apparent when the duty cycle of the Loran-C system is considered. That is, for the typical pulse group of eight pulses, the duty cycle varies from 1.6 to 5.3 percent, depending upon the particular PRP. Moreover, generally only the first three cycles of each pulse are considered, since these are free of sky-wave contamination, and this reduces the duty cycle to the range of 0.24 to 0.80 percent. Thus, it is imperative that some means of roughly ascertaining the time of the pulse group within the pulse repetition period must be provided.

This is accomplished in the sampling unit 18, by cross-correlating the received signals with internally-generated continuous-wave reference signals of the same frequency. These signals are generated in the servo means 38, 40, and 42, which couples the signals to the cycle samplers 116 and 118 (see FIG. 6) through the time-sharing circuitry 44, as has been explained. These cycle samplers act as synchronous detectors, and the detected Loran signals are filtered to generate their pulse envelopes. The resulting envelopes are then sampled once again by envelope samplers 122 and 124 to produce pulses which are assigned a digital value in the analog-to-digital converters 126 and 128, and the digitized samples are resolved in the arithmetic unit 20 into a single signal which is then decoded in the detector and sequential decoder 22 to determine the phase coding and pulse group location of the signals relative to the Loran PRP.

More specifically, the digital outputs of the converters 126 and 128 represent the X and Y components of a vector, due to the ninety degree phase shift in the reference signal. These two vector components are resolved in the arithmetic unit 20 into a single vector, which in turn can be integrated over several PRPs to determine if the Loran-C pulse is present. Further, the Loran function may sample at other positions within the PRP, and the sums accumulated over several PRPs are stored in specific memory locations. After each summation, the computed vector quantity is assigned one of three values, plus one, minus one, or zero, by the detector portion of unit 22. This ternary code is then sequentially decoded by unit 22 to determine whether the known Loran phase coding relationship is present. When a particular Loran pulse group has been detected and identified, the detector and sequential decoder 22 signals the control unit 24, which in turn initiates the Fine Search Mode by an appropriate command. Also, control signals begin to be sent to the time-difference measuring units 54 and 56 (see FIGS. 1 and 17). As will appear from examining the said copending patent application Ser. No. 454,073 filed May 7, 1965, the arithmetic unit 20, the address-assignment 36, and the read-write memory 34 all act in concert with the three servo means 38, 40, and 42 in order to update the internal reference signals through the use of phase-shift techniques, although this need not be further elaborated in the present application.

In addition to the presetting of the RF unit 16 through the use of the computing portion of the instrument, another very important operational procedure made possible by the present invention is the initial computation and use in Rough Search of the expected or approximate time-difference measurements for the present position of the aircraft. That is, from the present position information which is inserted into the instrument, and from information stored in memory, the approximate time differences (TD$x$ and TD$y$) are computed and used to preset the time-difference measuring units 46, 48 and 50 in order to simplify and speed the initial search operation. As has been pointed out, the problem in the Search Mode is to detect and identify the different signals being received. Since at best the pulse groupings occupy only about one-sixth of the PRP, it will be readily appreciated that the search operation can be performed much more efficiently if the approximate position of the pulse groups within the PRP is already known. Also, when one of the pulse groups has been detected and identified, it is possible to determine the approximate position of the other two pulse groups within the PRP if their approximate time differences are known.

The calculated approximate time differences TD$x$ and TD$y$ are coupled from the read-wire memory 34 directly to each of the three timing units 46, 48, and 50, by conductors 145, 147, and 149, respectively. These signals are coupled directly into the comparators such as 144 in the three different timing units, and consequently it will be apparent that these signals will cause the comparators to modify the reference timing output which they produce. The reference timing is modified such that it will occur just before the maximum-strength pulse group which has been detected.

Figure 18:
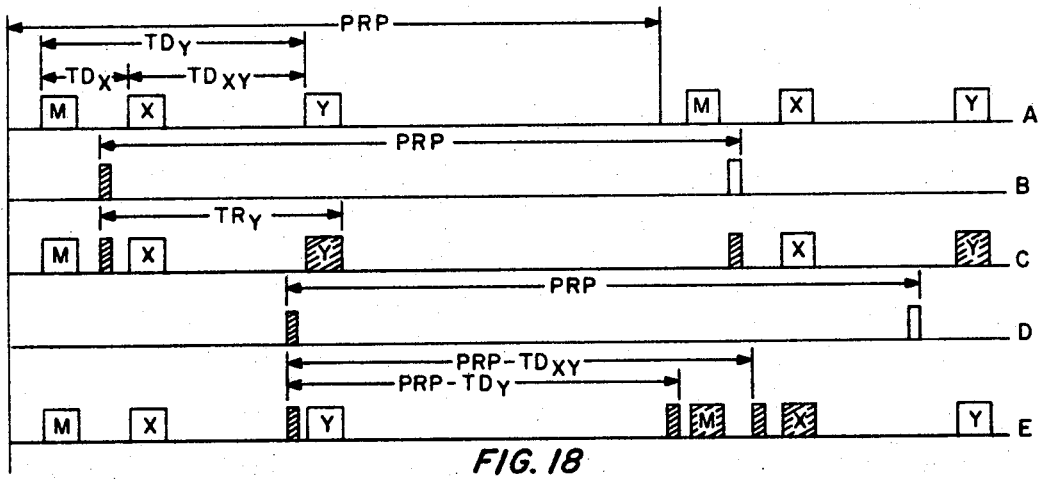
FIG. 18 is a schematic representation showing features of the operation of the timing units of FIG. 16.

This operation is illustrated in FIG. 18, in which the pulse groups are initially assumed to be oriented as shown at (A), the basic PRP of the Loran signals and the various time differences being appropriately labeled for clarity. The initial PRP of the internal reference timing is shown in this figure at (B). At (C) the PRP of the internal reference signal is shown applied to the transmitted pulse groups, and it is assumed that the slave Y pulse group has initially been detected (indicated by the cross-hatching). The modification of the timing of the internal reference signal is shown at (D) of this figure, where it will be noted that the reference pulse has been shifted to occur just before the detected pulse group (Y). This reduces the possibility of sky-wave contamination.

From the modified reference PRP illustrated, it will be clear that the approximate location of the other pulse groups within the Loren PRP can be determined in the manner shown and labeled at (E) of FIG. 18. As is here indicated, the basic computation necessary is merely one of subtraction once the first pulse group is detected, since the PRP of the Loran transmission is of course known. In connection with FIG. 18, it should be noted that the operations from (A) to (E) are sequential in real time, rather than in the parallel manner which this figure might be thought to suggest. The approximate time differences are used to preset the timing circuits in the manner discussed in detail in connection with FIG. 16, so that Fine Search techniques may be implemented immediately upon completing the Rough Search for the signals from one transmitting station. This naturally greatly reduces the required Rough Search time, since it is only necessary to perform the Rough Search operation with respect to one Loran transmitter, rather than all three transmitters.

In the Fine Search Mode of operation, the Loran pulses are precisely identified so that the actual time differences between the reception of pulses from each of the three Loran transmitters can be accurately measured. As has been stated, the Fine Search Mode of operation is automatically initiated upon completion of the Rough Search for any one of the three Loran signals, by the afore-mentioned signal from the detector and sequential decoder unit 22. At this time, the received signals have been identified by their phase-coding relationships as to master or slave and, it will be recalled, from the results of the Initialization Mode, the attenuation, AGC, and approximate time differences relative to all three Loran signals will have been determined. Therefore, during the Fine Search Mode it is possible to search for all three signals simultaneously by utilizing the appropriate gating techniques discussed throughout this specification. Further, it is to be noted that in the Fine Search Mode it is only necessary to search over that portion of the Loran PRP in which the actual Loran pulse groupings are expected.

The basic consideration in Fine Search is to precisely identify a given point on the Loran pulse envelope, such as the standard sampling point. As has been stated, this occurs between twenty-five and thirty microseconds after the beginning of the pulse. The phase relationship between the incoming signal and the reference signal is readily determined upon termination of the Rough Search Mode through the operation of the sampling and integrating techniques discussed in connection with FIG. 6, in which the samplings from the eight pulses in a single Loran pulse grouping are summed into a single high-energy pulse, which is then cross-correlated with stored values of the ideal Loran signal, in accordance with a cross-correlation constant generated in the arithmetic unit 20 and the read-write memory 34, in order to determine the sampling point. Accordingly, most of the functional component groupings making up the present integrated navigation instrument are used in the Fine Search Mode, with the exception of the control-display indicator 26, the read only memory 32, the control unit 24, and the time-difference measuring units 54 and 56.

Actually, it will be clear to those skilled in the art that a number of approaches may be utilized for the Fine Search Mode, including the more conventional derived envelope approach, or certain non-linear techniques such as zero-crossing detectors. However, it should be stated that by first using a cycle sampler and then a delayed envelope sampler, as is set forth herein, it is possible to detect the envelope of the Loran signal with great accuracy, within plus or minus five micro-seconds.

At the conclusion of the Fine Search operation, the proper gating signals for the RF unit 16, the sampler unit 18, the arithmetic unit 20, and the three servo means 38, 40, and 42 will have been established. As is fully set forth in the previously-identified copending application Ser. No. 454,073 filed May 7, 1965, the said servo means may then be closed by the operation of the arithmetic unit 20, the read-write memory 34, and the address-assignment unit 36, which function on a time-shared basis with each servo, so that the servo means then operates closed-loop to track the incoming Loran signals. Very briefly, this involves utilizing the computed phase angle difference between the incoming Loran signal and the internal-reference signal to change the initial conditions of the servo means such that the phase error is reduced to zero. As will be recalled, the reference signals from the servo means 38, 40, and 42 pass through the timing units 46, 48, and 50 before they actually operate to gate the sampling means 18, and correction signals may be applied at this stage in the manner set forth herein before, to precisely synchronize the internal timing of the receiver with that of the transmitted pulses. See FIG. 18(D).

In the Tracking Mode of operation then, the samplers 18, the timing loops, and the servo loops are all closed and tracking each of the three received Loran Signals, the digitized sampler outputs now preferably being filtered by the digital filtering techniques noted previously, rather than being integrated as in the search modes. The Loran time-difference information is continually measured, and the internal reference signal is continually updated in the timing units 46, 48, and 50 during tracking. The measured time difference produced by units 54 and 56 are coupled directly into the control unit 24, and the computer organization is used to continually compute orthogonal navigating information from the hyperbolic frame of reference established by the time differences. Once the orthogonal latitude and longitude is known, it will be clear that the computer organization may readily be utilized to calculate range, bearing, ground speed, track angle, and crosstrack error with respect to a preselected destination. Computing is performed simultaneously with the continual tracking, and the computer organization previously described will provide the afore-mentioned orthogonal information at the rate of ten solutions per second. Additionally, this computer organization will also provide the capability of computing a Loran memory mode of operation, or a dead-reckoning mode. This mode may be used to navigate in areas not covered by Loran-C, or during the signal search period, or in the event of a transmitter failure or malfunction in the RF unit of the present instrument.

Having now fully set forth the concepts underlying the present novel navigating instrument, having also set forth preferred embodiments and implementations of many of the functional component groupings to be utilized therein, and having further related complete cycles of its operation, it will be clear to those skilled in the art that the present invention constitutes a significant step forward in navigating techniques and also in the achievement of maximum economy and reliability in the construction of such units. Obviously a variety of specific physical implementations of the inventive concepts involved are possible, as are various modifications and alterations in the specific circuits presented herein. Accordingly, all such variations and modifications are to be considered as contained within the scope of the claims appended here below, unless these claims by their language specifically state otherwise.

We claim:

1. An integrated electronic navigation instrument having combined receiving and computing means with interdependent operational elements, for providing substantially instantaneous orthogonal coordinate navigating information from the radio signals of a predetermined complex of transmitting stations, said instrument comprising: RF tuning means for initially receiving said radio signals; a central memory unit; a central arithmetic unit; a central control unit; and circuitry interconnecting said tuning means and said central memory, central arithmetic, and central control units; said control unit including timing circuits and priority circuits for producing sequencing control signals to be coupled by said interconnecting circuitry to said tuning means and said memory and arithmetic units for time-sharing the same to select desired different portions of the signals received by said tuning means, and for time-sharing said memory and arithmetic units to automatically compute orthogonal coordinate information from said selected different portions of said signals.

2. An integrated electronic navigation instrument having combined receiving and computing means with interdependent operational elements, for providing substantially instantaneous orthogonal coordinate navigating information from the radio signals of a predetermined complex of transmitting stations, said instrument comprising: RF tuning means for initially receiving said radio signals; a central memory unit; a central arithmetic unit; a central counting unit for measuring time differences; a central control unit; and circuitry interconnecting said tuning means and said central memory, central arithmetic, central counting, and central control units; said control unit including timing circuits and priority circuits for producing sequencing control signals to be coupled by said interconnecting circuitry to said tuning means and said memory, arithmetic, and counting units are time-sharing the same to select desired different portions of the signals received by said tuning means and to measure time differences between said selected different portions, and for time-sharing said memory and arithmetic units to automatically compute orthogonal coordinate information from said measured time differences.

3. An integrated electronic navigation instrument having combined receiving and computing means with interdependent operational elements, for providing substantially instantaneous orthogonal coordinate navigating information for the radio signals of a predetermined complex of transmitting stations, said instrument comprising: RF tuning means for initially receiving said radio signals; means for sampling the received signals at predetermined intervals; a central memory unit; a central arithmetic unit; a central counting unit for measuring time differences; a central control unit; and circuitry interconnecting said tuning means, said sampling means, and said central memory, central arithmetic, central counting, and central control units; said control unit including timing circuits and priority circuits for producing sequencing control signals to be coupled by said interconnecting circuitry to said tuning means, said sampling means, and said memory, arithmetic, and counting units for time-sharing the same to sample the signals received by said tuning means and thereby to select desired different portions of such signals and to measure the time differences between the sampled signal portions, and for time-sharing said memory and arithmetic units to automatically compute orthogonal coordinate information from said measured time differences.

4. An integrated electronic navigation instrument having combined receiving and computing means with interdependent operational elements, for providing substantially instantaneous orthogonal coordinate navigating information from the radio signals of a predetermined complex of transmitting stations, said instrument comprising: RF tuning means for initially receiving said radio signals; means for sampling the received signals at predetermined intervals; means for correlating the sampled signals to identify those from the different stations in said complex; a central memory unit; a central arithmetic unit; a central counting unit for measuring time differences; a central control unit; and circuitry interconnecting said tuning means, said sampling means, said correlating means and said central memory, central arithmetic, central counting, and central control units; said control unit including timing circuits and priority circuits for producing sequencing control signals to be coupled by said interconnecting circuitry to said tuning, sampling, and correlating means and said central memory, central arithmetic, and central counting units for time-sharing the same to sample the signals received by said tuning means and thereby select desired different portions of such signals, to correlate the sampled signal portions and identify the signals from the different stations in said complex, and to measure the time differences between the sampled and correlated signal portions, and also for time-sharing said memory and arithmetic units for automatically compute orthogonal coordinate information from said measured time differences.

5. An integrated electronic navigation instrument having combined receiving and computing means with interdependent operational elements, for providing substantially instantaneous orthogonal coordinate navigating information from the radio signals of a predetermined complex of transmitting stations, said instrument comprising: RF tuning means for initially receiving said radio signals; means for sampling the received signals at predetermined intervals; means for integratng the signal samplings over a predetermined period to maximize received power; means for digitizing the integrated samplings; means for correlating the digitized samples to identify the signals from the different stations in the said complex; a central memory unit; a central arithmetic unit; a central counting unit for measuring time differences; a central control unit; and circuitry interconnecting said tuning, sampling, integrating, digitizing, and correlating means and said central memory, central arithmetic, central counting, and central control units; said control unit including timing circuits and priority circuits for producing sequencing control signals to be coupled by said interconnecting circuitry to said tuning, sampling, integrating, digitizing, and correlating means and said central memory, central arithmetic, and central counting units for time-sharing the same to sample the signals received by said tuning means and thereby select desired different portions of such signals, to integrate said sampled signal portions, to digitize said integrated signal samplings, to correlate the digitized integrated signal samplings and identify the signals from different stations in said complex, and to measure the time differences between the integrated, digitized, and correlated signal samplings, and also for time-sharing said memory and arithmetic units to automatically compute orthogonal coordinate information from said measured time differences.

6. An electronic navigation instrument having receiving and computing means for providing substantially instantaneous orthogonal coordinate navigating information from the radio signals of a predetermined complex of transmitting stations, said instrument comprising: receiver means including RF tuning means for initially receiving said radio signals, means for determining time-difference information from preselected portions of the signals received and circuit means responsive to predetermined control signals to vary the operational parameters of at least one of said RF tuning means and time difference determining means; means for automatically and substantially instantaneously computing orthogonal coordinate information from said time-difference information; pilot-operable control means for operatively inserting present position information known to the pilot into the said computing means; and circuitry operatively interconnecting the said receiver means, computing means, and control means; said computing means acting upon said inserted present position information to compute therefrom control signals representative of the expected signal strength of signals to be received at said present position from at least one individual station in said complex; and said interconnecting circuitry coupling said computed control signals to said control signal responsive circuit means to automatically vary said operational parameters and thereby preset the latter in accordance with the said expected signal strength to facilitate the acquisition and reception of said individual station signals.

7. The navigation instrument recited in claim 6, wherein said computed control signals representative of signal strength are representative of the maximum expected signol strength of signals to be received from any of the stations in said complex, and wherein said circuit means responsive to said control signals presets said tuning means in accordance with said computed maximum signal strength, to facilitate acquisition and reception of such signals from the particular station transmitting the same.

8. The navigation instrument of claim 7, wherein said circuit means responsive to said control signals includes variable signal attenuation means for automatically attenuating the maximum strength signals received from said station in said complex in accordance with said computed control signals.

9. The navigation instrument of claim 7, wherein said circuit means responsive to said control signals includes variable gain amplifying circuitry coupled to said RF tuning means, and said control signals representative of the said computed maximum signal strength vary the gain of said amplifying circuitry such that the amplifying circuitry amplifies the received signals in a manner producing an output having a predetermined level.

10. The navigation instrument of claim 7, wherein said circuit means responsive to said control signals includes both variable signal attenuation means and variable gain amplifying circuitry, for automatically attenuating the maximum strength signals received in a predetermined manner and varying the gain of said amplifying circuitry such that the amplifying circuitry amplifies said signals in a manner producing an output of a predetermined level, whereby said receiver means receives said maximum strength transmitter signals and automatically produces a predetermined output of substantially constant amplitude.

11. An electronic navigation instrument having receiving and computing means for providing substantially instantaneous orthogonal coordinate navigating information from the radio signals of a complex of at least three spaced transmitting stations; said instrument comprising: RF tuning means for initially receiving said radio signals; circuit means coupled to said tuning means for varying the operational parameters thereof in response to predetermined control signals; means for determining time-difference information from preselected portions of the signals from each of said stations in said complex; means for automatically and substantially instantaneously computing orthogonal coordinate information from said time-difference information; pilot-operable control means for operatively inserting present position information known to the pilot into the said computing means; and circuitry operatively interconnecting the said tuning means, circuit means, time-difference determining means, computing means and control means; said computing means acting upon said inserted present position information to compute therefrom control signals representative of the expected signal strength for the acquisition and reception of signals from each of said stations in said complex; and said interconnecting circuitry coupling said computed control signals to said circuit means responsive thereto to automatically vary said operational parameters and thereby preset said tuning means in accordance with said computed expected signal strength to facilitate the individual acquisition and reception of signals from each of the said stations.

12. The navigation instrument recited in claim 11, wherein said computed control signals representative of signal strength are representative of the expected signal strength of signals received from each of the individual stations in said complex, and wherein said circuit means responsive to said control signals presets said tuning means in accordance with the computed signal strength means for each individual station, to facilitate the individual acquisition and reception of signals from each station transmitting the same.

13. The navigation instrument of claim 12, wherein said circuitry responsive to said control signals includes variable signal attenuation means for automatically attenuating the strength of the signals received from each of said stations in said complex in accordance with said computed control signals.

14. The navigation instrument of claim 12, wherein said circuitry responsive to said control signals includes variable gain amplifying circuitry, and said control signals representative of the said computed expected signal strength vary the gain of said amplifying circuitry such that the amplifying circuitry produces an output having a predetermined level for each of the signals received.

15. The navigation instrument of claim 12, wherein said circuitry responsive to said control signals includes both variable signal attenuation means and variable gain amplifying circuitry for automatically attenuating each of the signals received in a predetermined manner and varying the gain of said amplifying circuitry such that the latter produces an output having a predetermined level for each of the signals received.

16. An electronic navigation instrument having receiving and computing means for providing substantially instantaneous orthogonal coordinate navigating information from the radio signals of a predetermined complex of transmitting stations, said instrument comprising: RF tuning means for initially receiving said radio signals; means for determining time-difference information from preselected portions of the signals received; means for automatically and substantially instantaneously computing orthogonal coordinate information from said time-difference information; pilot-operable control means for operatively inserting present position information known to the pilot into the said computing means; circuit means responsive to predetermined control signals to vary the operation of said time-difference determining means; and circuitry operatively interconnecting all of the said means; said computing means acting upon said inserted present position information to compute therefrom control signals representative of initial time-difference information for at least some of the signals expected to be received at the present position; and said interconnecting circuitry coupling said computed control signals to said control signal responsive circuit means to automatically vary the operation of said time-difference determining means and thereby preset the same in accordance with said computed time-difference information to facilitate and speed beginning operation of the same.

17. The navigation instrument recited in claim 16, wherein said predetermined complex of transmitting stations includes at least three mutually spaced stations, wherein said computing means computes from said inserted present position information control signals representative of initial time-difference information for all of the signals expected to be received at the said present position, and wherein said control signal-responsive circuit means in response to said control signals automatically varies the operation of said time-difference determining means to preset the same in accordance with the expected time differences for all of said signals.

18. The navigation instrument recited in claim 16, further including means for sampling the received signals at predetermined intervals to produce said preselected signal portions for said time-difference determining means, wherein said circuit means responsive to said control signals varies the operation of said sampling means to automatically preset the same in accordance with said computed time-difference information, to vary and control the interval of sampling of said sampling means and thereby facilitate and speed beginning operation of said time-difference determining means.

19. The navigation instrument recited in claim 18, further including means for correlating the sampled signals from said sampling means to identify those from the different stations in said complex, wherein said means for determining time-difference information makes such determination from the correlated signal samplings.

20. A method of signal search and acquisition for electronic navigation equipment of the type having signal-receiving and computing means for automatically producing orthogonal navigation information from the radio signals of a predetermined complex of transmitting stations, said method comprising the steps: inserting known present position information into said computing means; using said computing means to compute the expected signal strength of at least some of the signals to be received from said station complex at that position from the inserted position information; and automatically pre-setting the operating level of said receiving means in accordance with said computed signal strength data to facilitate reception of said signals.

21. A method of signal search and acquisition for electronic navigation equipment of the type having signal-receiving and computing means for automatically producing orthogonal navigation information from the radio signals of a predetermined complex of transmitting stations, said method comprising the steps: inserting known present position information into said computing means; using said computing means to compute the expected signal strength of at least some of the signals to be received from said station complex at that position from the inserted position information; and automatically attenuating the signals at said receiving means in accordance with said computed signal strength data to facilitate reception of said signals by preventing saturation of the said receiving means.

22. A method of signal search and acquisition for electronic navigation equipment of the type having signal-receiving and computing means for automatically producing orthogonal navigation information from the radio signals of a predetermined complex of transmitting stations, said method comprising the steps: inserting known present position information into said computing means; using said computing means to compute from the inserted present position information the maximum expected signal strength of signals to be received at that position from any of the stations in said complex; and automatically pre-setting the operating level of said receiving means in accordance with said computed signal strength data to facilitate reception of said signals.

23. A method of signal search and acquisition for electronic navigation equipment of the type having signal-receiving, time-difference measuring, and computing means for first determining time-difference information from the radio signals of a predetermined complex of transmitting stations and then automatically computing orthogonal navigation information from said time-difference information, said method comprising the steps: inserting known present position information into said computing means; using said computing means to compute expected time-difference information for that position from the inserted present information; and automatically pre-setting the operational parameters of said time-difference measuring means in accordance with said computed information to facilitate and speed initial time-difference measurements.

24. A method of signal search and acquisition for electronic navigation equipment of the type having signal-receiving, time-difference measuring, and computing means for first determining time-difference information from the radio signals of a predetermined complex of transmitting stations and then automatically computing orthogonal navigation information from said time-difference information, said method comprising the steps: inserting known present position information into said computing means; using said computing means to compute from the inserted present position information the maximum expected signal strength of signals to be received at that position from any of the stations in said complex; computing expected time-difference information for that position from the inserted present position information; automatically pre-setting the operating level of said receiving means in accordance with said computed signal strength data; and automatically pre-setting the operational parameters of said time-difference measuring means in accordance with said computed information to facilitate initial receipt of said signal and to speed initial time-difference measurements.

References Cited

UNITED STATES PATENTS

| | | | |
|---|---|---|---|
| 3,020,545 | 2/1962 | Losher | 343—103 |
| 3,113,313 | 12/1963 | Roberts | 235—150.272 |
| 3,204,241 | 8/1965 | Bjorkman | 343—103 X |
| 3,151,322 | 9/1964 | Hildebrandt | 343—7.3 X |

RODNEY D. BENNETT, *Primary Examiner.*

CHESTER L. JUSTUS, *Examiner.*

H. C. WAMSLEY, *Assistant Examiner.*